United States Patent [19]

Castle

[11] Patent Number: 4,969,112
[45] Date of Patent: Nov. 6, 1990

[54] WIRELESS WEIGHING SYSTEM

[75] Inventor: Jonathan Castle, Mission Hills, Calif.

[73] Assignee: Moore Industries-International, Inc., Sepulveda, Calif.

[21] Appl. No.: 258,265

[22] Filed: Oct. 14, 1988

[51] Int. Cl.5 .................. G01G 19/02; G06F 15/20
[52] U.S. Cl. .................... 364/567; 177/25.13; 177/136; 340/505; 340/825.07; 364/200; 364/514
[58] Field of Search .............. 250/316.5; 356/51; 177/25.11, 25.12, 25.13, 25.14, 134, 136, DIG. 10; 340/505, 825.07, 825.08; 364/200, 900, 565, 466, 506, 550, 514; 455/608, 617

[56] References Cited

U.S. PATENT DOCUMENTS

| 3,692,129 | 9/1972 | Pratt et al. | 177/134 |
|---|---|---|---|
| 3,842,922 | 10/1974 | Fagin et al. | 177/25 |
| 3,935,914 | 2/1976 | Nordstrom et al. | 177/134 |
| 3,966,002 | 6/1976 | Schneider | 177/136 |
| 4,094,367 | 6/1978 | Jones et al. | 364/567 |
| 4,151,407 | 4/1979 | McBride et al. | 455/617 |
| 4,177,515 | 12/1979 | Jenkins et al. | 364/200 |
| 4,225,926 | 9/1982 | Wendt | 364/567 |
| 4,328,494 | 5/1982 | Goodall | 177/DIG. 10 |
| 4,465,151 | 8/1984 | Gorman et al. | 177/25.13 |
| 4,502,555 | 3/1985 | Gower | 364/567 |
| 4,551,710 | 11/1985 | Troup et al. | 340/505 |
| 4,639,872 | 1/1987 | McHale et al. | 364/567 |
| 4,655,304 | 4/1987 | Tajima | 364/466 |
| 4,682,144 | 7/1987 | Ochiai et al. | 340/505 |
| 4,742,572 | 5/1988 | Yokoyama | 340/825.07 |
| 4,773,005 | 9/1988 | Sullivan | 364/200 |
| 4,839,835 | 6/1989 | Hagenbuch | 364/567 |

Primary Examiner—Kevin J. Teska
Attorney, Agent, or Firm—Welsh & Katz, Ltd.

[57] ABSTRACT

A wireless weighing system for determining the weight of each wheel of a vehicle and for combinations and percentages thereof. Wheel weighing pads are placed under respective wheels of the vehicle and each contains a load cell whose analog output is converted to a digital value which can be transmitted to a central control. The communications technique uses infra-red radiation and a digital protocol which allows the central control to interrogate each individual weighing pad and receive a weight response without interference. The interrogation signal of the central control comprises a series of pulse envelopes containing high intensity IR pulses of a short duration where the duration of the envelope and position in the sequence indicates an address of a respective wheel pad. As each wheel pad is interrogated, it responds with an information signal, which comprises a series of pulse groups in an envelope containing high intensity IR pulses of a short duration where the duration of a pulse group indicates the presence or absence of a data bit in the sequence.

35 Claims, 23 Drawing Sheets

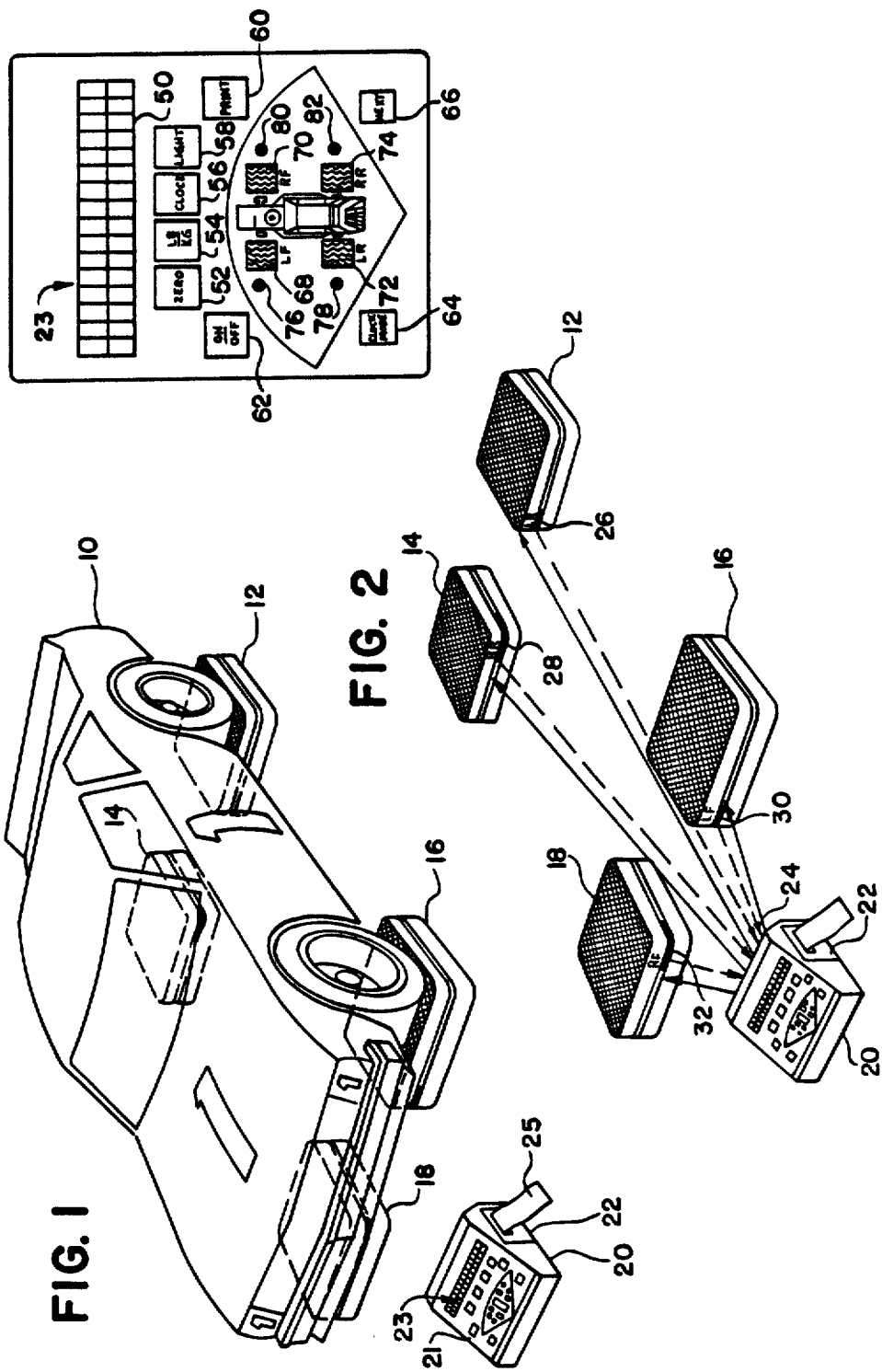

FIG. 3A   LIQUID CRYSTAL DISPLAY FORMATS:

```
                  WIRELESS SCALE              WIRELESS SCALE
SIGN ON -         LB UNITS (#)                KG UNITS (K)
FOUR PADS -       LF=nnn#   RF=nnn#           LF=nnnK   RF=nnnK
                  LR=nnn#   RR=nnn#           LR=nnnK   RR=nnnK
FOUR PERCENTS -   LFnn.n%   RFnn.n%           LFnn.n%   RFnn.n%
                  LRnn.n%   RRnn.n%           LRnn.n%   RRnn.n%
FRONT & REAR -    Frnt=nnnn#    nn.n%         Frnt=nnnnK    nn.n%
                  Rear=nnnn#    nn.n%         Rear=nnnnK    nn.n%
LEFT & RIGHT -    Left=nnnn#    nn.n%         Left=nnnnK    nn.n%
                  Rght=nnnn#    nn.n%         Rght=nnnnK    nn.n%
DIAGONALS -       LF RR=nnnn#   nn%           LF RR=nnnnK   nn%
                  RF LR=nnnn#   nn%           RF LR=nnnnK   nn%
TOTAL -               Total Weight                Total Weight
                  nnnnLB    nnnnKG             nnnnLB    nnnnKG
SELECTABLE -      nnnn   nnnn   nn.n%         nnnn   nnnn   nn.n%
                  nnnn   nnnn   nnnn#         nnnn   nnnn   nnnnK
TIME & DATE -     hh:mm:ss day                hh:mm:ss day
                  Mon nn, nnnn                Mon nn, day
BATTERY LOW -         Warning!                    Warning!
                  Battery is Low.             Battery is Low.
```

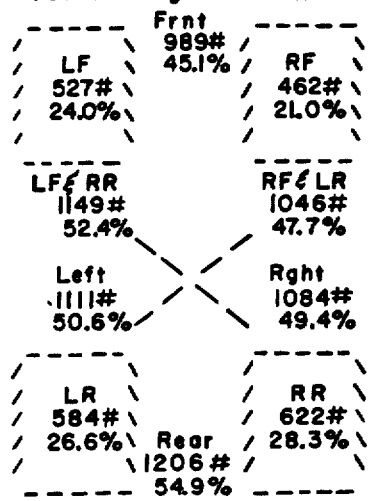

FIG. 3B

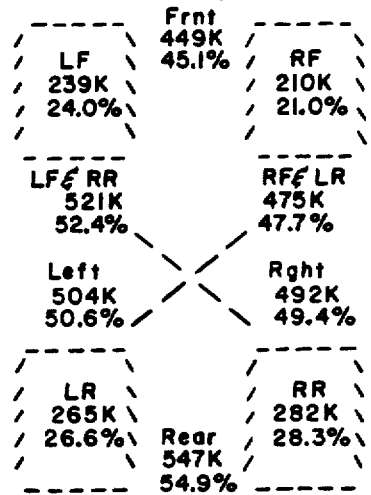

FIG. 3C

| Condition: | Color | Blink | Color (R5) | Ornge (R6) | Blink (R7) |
|---|---|---|---|---|---|
| 1. No zero, pad data ok. | Green | No | 01 | 00 | 00 |
| 2. No zero, pad data error. | Red | No | 10 | 00 | 00 |
| 3. Pad data @ zero ok, still ok. | Green | No | 01 | 00 | 00 |
| 4. Pad data @ zero ok, now error | Amber | Yes | 01 | 11 | 11 |
| 5. Pad data @ zero error, now ok. | Green | Yes | 01 | 00 | 11 |
| 6. Pad data @ zero error, still err. | Red | No | 10 | 00 | 00 |

FIG. 3D

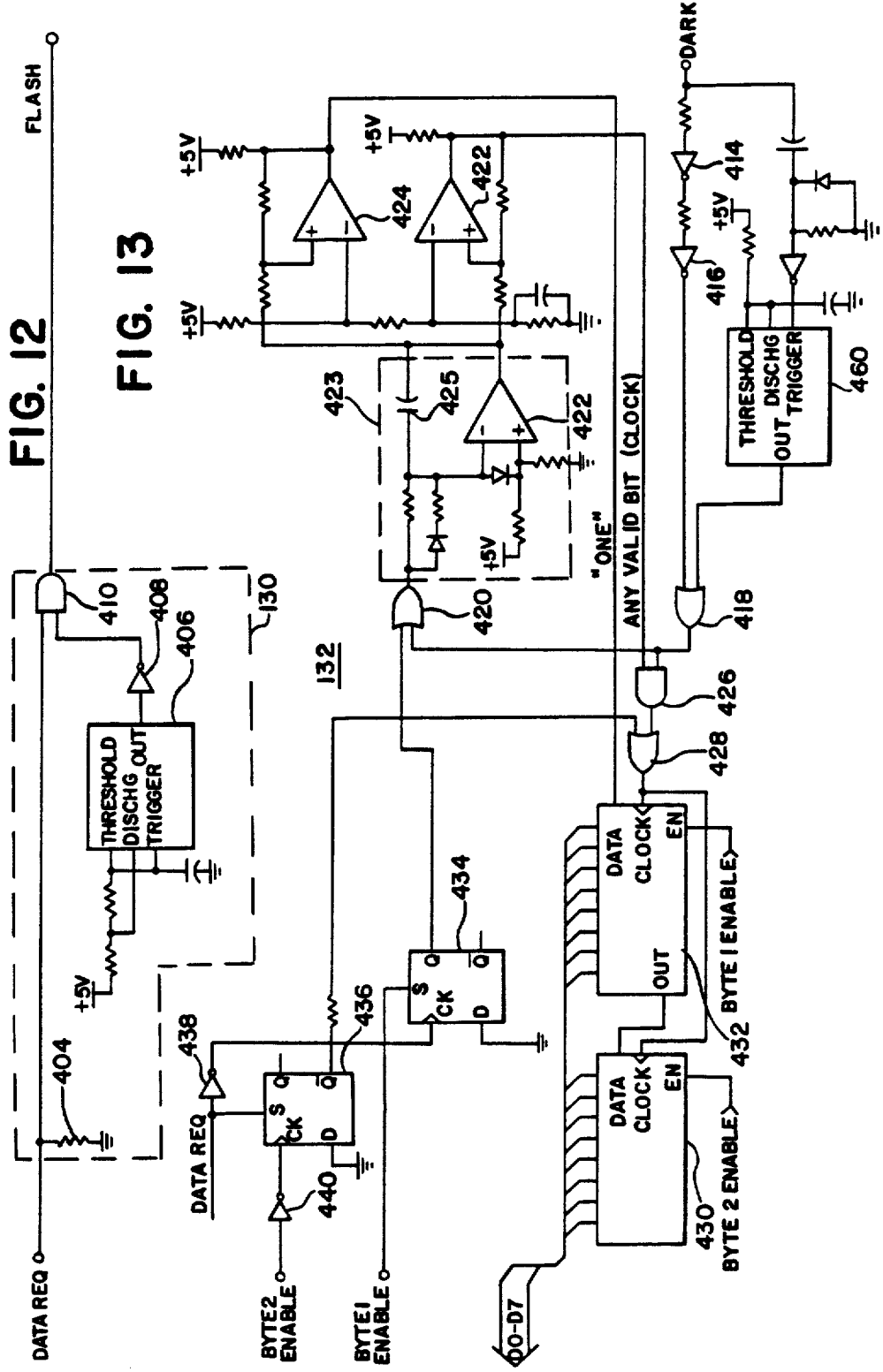

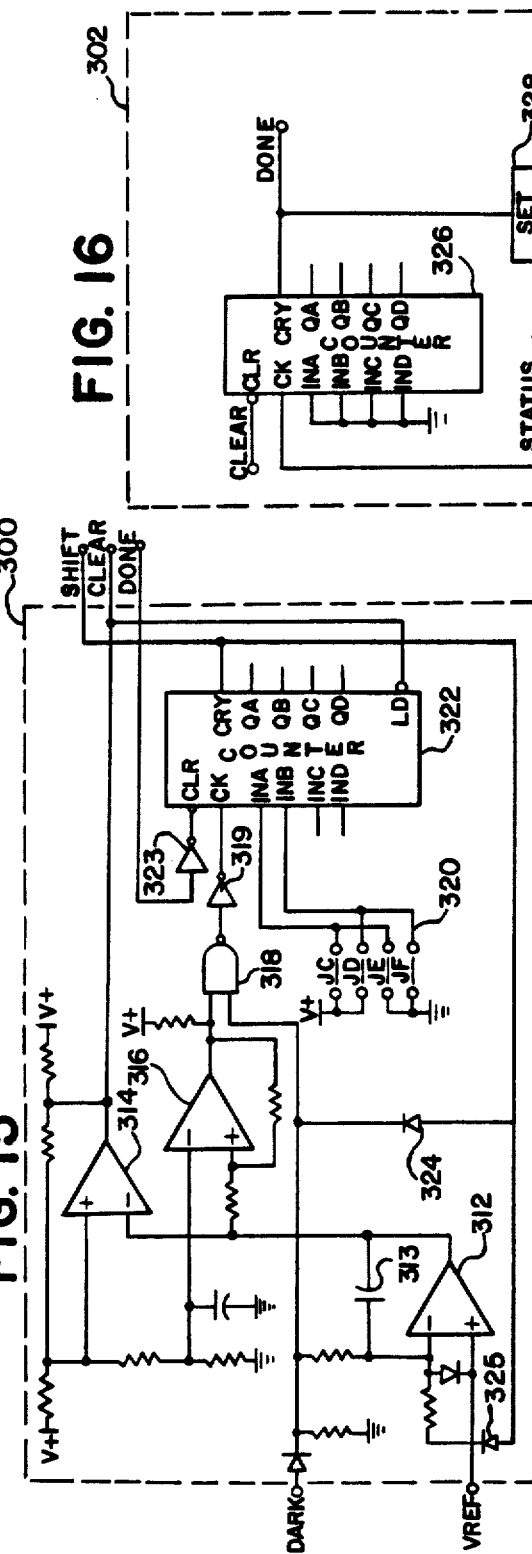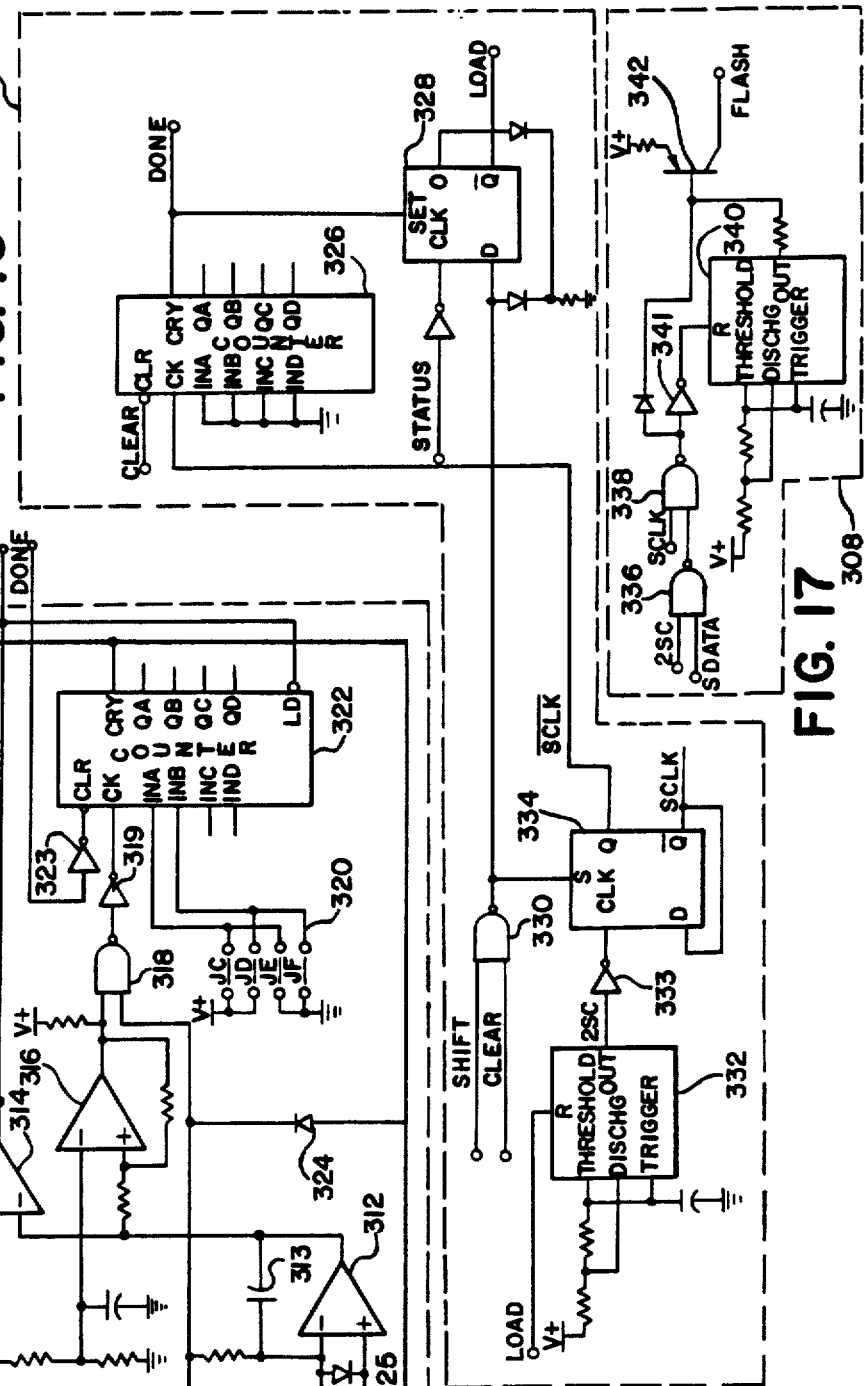

OPR MODE

| B0 | B1 | B2 | B3 | B4 | B5 | B6 | B7 |
|----|----|----|----|----|----|----|----|

- B7: REAL/STORED WEIGHTS
- B6: BATTERY OK
- B5: BATTERY LOW MESSAGE
- B3 B4:
  - 0 0 POUNDS
  - 0 1 KILOGRAMS
  - 1 0 RAW DATA DESCRIPTIONS
  - 1 1 RAW DATA
- B0 B1 B2:
  - 000 WEIGHT ALL FOUR WHEELS
  - 001 PERCENTAGE ALL FOUR WHEELS
  - 010 FRONT AND REAR COMBINATION, WEIGHT AND PERCENTAGE
  - 011 LEFT AND RIGHT COMBINATION, WEIGHT AND PERCENTAGE
  - 100 DIAGONALS, WEIGHT, AND PERCENTAGE
  - 101 TOTAL WEIGHT
  - 110 SELECTED PAD COMBINATIONS
  - 111 SIGN ON

LOST SGNL

| B0 | B1 | B2 | B3 | B4 | B5 | B6 | B7 |
|----|----|----|----|----|----|----|----|

- B7: INVERTED EACH CYCLE OF BLINK
- B6: B4 FLAG CHANGE
- B5: LED BLINK FLAG
- B4: DISPLAYING ERROR SEQUENCE
- B3: ZERO PUSH BUTTON
- B0 B1 B2:
  - 000 IDLE
  - 001 LOST SIGNAL(S)
  - 010 CHECK PADS AIM
  - 011 ARE SWITCHES ON?
  - 100 BATTERIES OK?
  - 101 TO USE LESS PADS, YOU MUST REZERO

FIG. 19

WIRELESS WEIGHING SYSTEM

FIELD OF THE INVENTION

The invention pertains generally to a wireless weighing system and is more particularly directed to a weighing system in which a central control communicates among a plurality of weighing pads by means of an infra-red (IR) radiation communications system.

BACKGROUND OF THE INVENTION

There are many examples of electronic weighing apparatus or scales in the past. In some instances, it has been necessary to provide such weighing apparatus with multiple weighing points such that the weight of a load can be measured at several locations. For example, a race car needs to be balanced so that the weight on each wheel, on each end, on each side, and on each diagonal are substantially equivalent or some particular percentage of the total weight. These numbers may change and depend on a particular setup for a track. Such weighing systems, therefore, comprise a plurality of weighing pads upon which a wheel of a race vehicle is situated so that the weights for these individual locations of the load can be determined.

Previously, the multiple weighing pads of these systems have been hardwired or physically connected by detachable wires to the control unit used to interface with an operator. These hardwired systems lack flexibility and are difficult to use because the wires must be connected to the central control before weight readings can be taken. The wires can become tangled or broken and, when detachable, tend to be lost. The physical length and connections of the wires tend to limit the positioning of the central control when taking the weight measurements. This can be detrimental in situations that occur in garages and races where there may be limited access because of other equipment or personnel at that position. Further, many times the wires of electronic weighing apparatus serve as pickups for radio frequency interference which is particularly prevalent around automobiles and electronic equipment used in garage and racing locals. What is needed is a wireless weighing system including a means for the short range communication of weight information which is free from interference and can be easily implemented for an automotive racing environment.

One of the more popular communications systems for the transmission of information over short ranges is an infra-red communications system which uses optical radiation in the infra-red band as the transmission media. It is known that such systems can transmit either analog or digital information. Infra-red communications systems have several inherent advantages in that they do not generate radio frequency interference which might interfere with other electronic devices and, more importantly, infra-red receivers are virtually unaffected by radio frequency interference produced by the other devices.

One such infra-red transmission system is shown in U.S. Pat. No. 4,151,407 issued to McBride et al. McBride et al. is used for such applications as a portable transmitter which transmits infra-red information from a plurality of sensors or medical electrodes attached to a patient to a remote monitor. Additionally, a portable hand-held digital transmitter is utilized for video game control and on/off channel selection for television using infra-red energy transmission.

While the reference to McBride et al. illustrates a system where several multiplexed elements can be separated by frequency channels, the system does not disclose the manner of differentiating between a number of remote units which use digital codes. Such digital codes are much easier for modern microprocessor controls to generate and frequency modulators and demodulators can be eliminated from such systems.

Moreover, the previous systems do not teach a wireless system which can operate in high levels of ambient sunlight or other optical radiation sources with the possibly interfering sources at variable distances from the communications system. Such is the environment for a racing vehicle where a wireless weighing system would be used.

SUMMARY OF THE INVENTION

The invention solves many of the problems of prior electronic weighing systems by providing a wireless weighing apparatus having an infra-red (IR) communications system which is unaffected by radio frequency interference and has a high tolerance to adverse ambient optical frequency interference such as from sunlight, headlights, incandescent lamps, fluorescent lamps, etc. which are usually found in a garage or racing environment. The wireless nature of the system allows for the flexibility of movement and placement of system components without concern for the breakage and touching of connections and wires.

In the preferred embodiment, the weighing system comprises a central control and plurality of weighing pads. The central control communicates to each weighing pad by means of a bidirectional infra-red communications system. The central control is able to interrogate each weighing pad in a sequence and receive back a response representative of the weight of the load on the particular weighing pad at that time. The central control includes means for generating an interrogate signal as a sequence of pulse envelopes of a predetermined duration. Each of the weighing pads decodes the interrogate signal and in response thereto returns an information message in digital format comprising the weight measured by the module. Each of the signals, interrogate and response, comprise pulse envelopes of different durations which are used for the control and differentiation of the direction of information transfer.

In one preferred implementation, the interrogate signal is broadcast as a first master pulse followed by a series of address pulses, wherein the first master pulse can be differentiated from subsequent address pulses by its duration. The receivers of the weighing pads include address decoders which are reset by the master pulse and begin counting the number of address pulses following the initial master pulse. Each weighing pad is assigned to a specific address pulse and responds to the master pulse in combination with its address pulse. The response occurs between the falling edge of an address pulse and the beginning of the next address pulse.

The pulse envelopes, both interrogate and response, are comprised of many pulses of a short duration and low duty cycle but of high intensity. This provides a method for discriminating between high ambient levels of optical radiation which are essentially a DC level and the pulses which are very short in duration and thus AC in nature. The short duration of each pulse means that a very high intensity can be generated for noise resistance without severely consuming power.

These and other objects, features, and aspects of the invention will become clearer and more fully understood when the following detailed description is read in conjunction with the appended drawings wherein:

BRIEF DESCRIPTION OF THE DRAWINGS

FIG. 1 is a pictorial representation of a wireless weighing system constructed in accordance with the invention which is adapted to support a load at various locations;

FIG. 2 is a pictorial representation of the weighing system illustrated in FIG. 1 showing the bidirectional infra-red communications among the central control unit and the plurality of weighing pads;

FIG. 3 is a pictorial representation of the display face of the central control of the weighing system illustrated in FIG. 1;

FIG. 3A is a pictorial representation of the display formats for different message modes of the LCD of the system illustrated in FIG. 1;

FIG. 3B is a pictorial representation of a printout in pounds format from the printer of the system illustrated in FIG. 1;

FIG. 3C is a pictorial representation of a printout in Kilograms format for the printer of the system illustrated in FIG. 1;

FIG. 3D is a condition table illustrating different annunciation states for different communications channel conditions.

FIG. 12 is a detailed electrical schematic of the transmit interface illustrated in FIG. 7;

FIG. 13 is a detailed electrical schematic of the receive interface illustrated in FIG. 7;

FIG. 15 is a detailed electrical schematic diagram of the address decoder illustrated in FIG. 14;

FIG. 16 is a detailed electrical schematic diagram of the clock circuit illustrated in FIG. 14;

FIG. 17 is a detailed electrical schematic diagram of the transmit interface illustrated in FIG. 14;

FIG. 19 is a pictorial representation of the various control locations which hold flags indicating modes or conditions of the system illustrated in FIG. 1;

DETAILED DESCRIPTION OF THE PREFERRED EMBODIMENT

Figure 4:
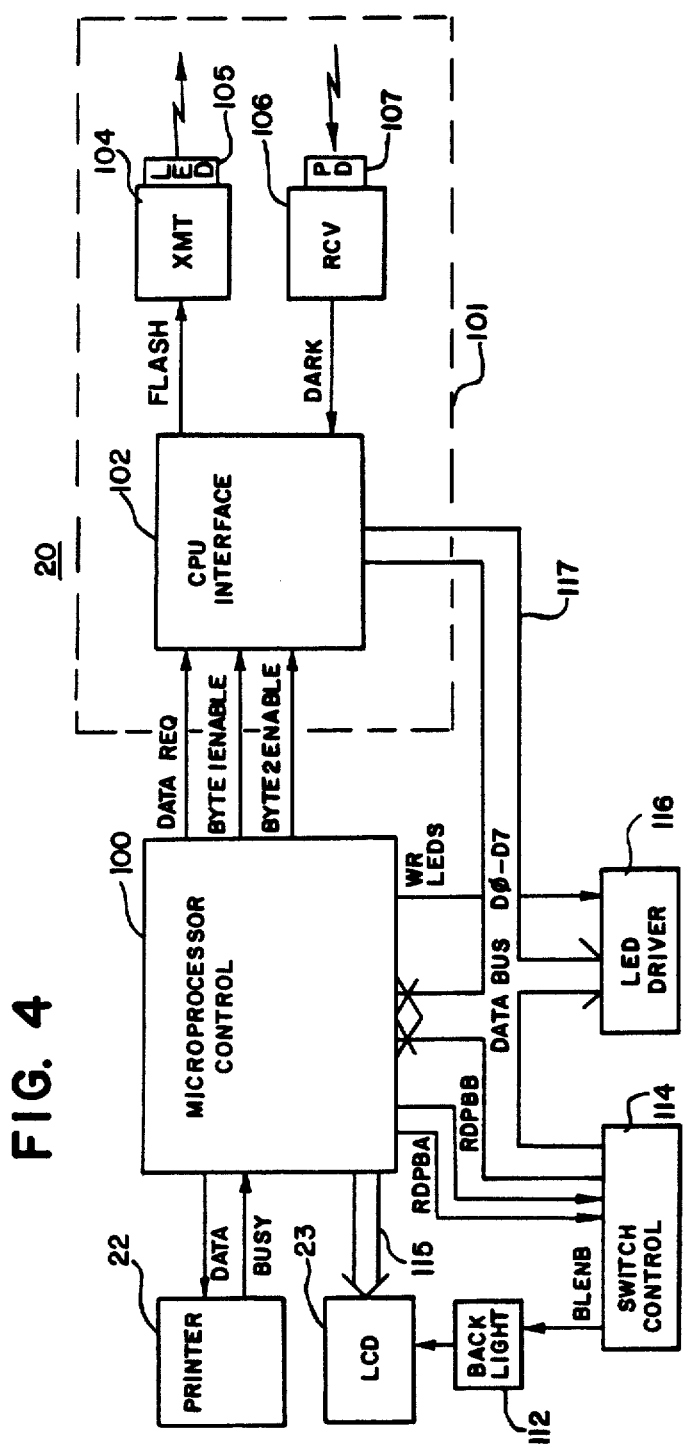
FIG. 4 is a system block diagram of the circuitry forming the central control of the system illustrated in FIG. 1.

There is shown in FIG. 1 a wireless weighing system constructed in accordance with the invention. The weighing system comprises a plurality of remote modules or weighing pads 12, 14, 16 and 18 which communicate without physical attachment to a central control 20. The weighing pads 12, 14, 16 and 18 are positioned at certain locations with respect to a load 10. The load 10, in the example shown, is a racing vehicle, but such could be any other equivalent type load. The weighing system determines the weight of the load at a particular location such that it can be balanced and/or supported with respect to that location.

In the racing vehicle environment, such balancing is needed for the track set-up, and can also be used to determine fuel usage or balance from different fuel tanks during a race. Because of the particular need for such weighing systems in the racing environment, the preferred embodiment will be described for use therein. Such description should, however, be taken as merely exemplary and not limiting. While four weighing pads are shown for a vehicle, one for each wheel, it will become evident in the following description that any number of pads can be used depending upon the load weighed.

The central control 20 of the wireless weighing system communicates through the air to the weighing pads 12, 14, 16 and 18 under the control of an operator. The operator interfaces with the central control 20 by means of a number of control keys which are integrated into a touch pad 21 on the display face of the central control 20. Additionally, a liquid crystal display (LCD) 23 is provided on the face of the central control 20 to provide alphanumeric information to the operator. A hard copy output from the system is provided via a printer 22 which is built into the central control 20 and presents a tape 25 in an easily readable and understandable format.

Preferably, the communications system which the wireless weighing system uses includes the transmission of infra-red radiation modulated with digital information. As better seen in FIG. 2, the central control 20 has an optical eye 24 which can transmit infra-red radiation (solid arrows) to and receive infra-red radiation (dashed arrows) from each of the weighing pads 12, 14, 16 and 18. Similarly, electric eyes at 26, 28, 30 and 32 are provided for each of the pads 12, 14, 16 and 18, respectively. Each of the pad electric eyes receives IR radiation from the central control 20 and transmits IR radiation back.

Communications can take place between elements by such infra-red transmissions and receptions as long as the central control 20 can "see" the transmissions of the remote pads, and the weighing pads can "see" the transmissions of the central control. This provides a very facile communication system where the pads 12, 14, 16 and 18 and the central control 20 need only have an optical path connecting them. Because of the wide fan-shaped transmissions of the control and pads, this optical path is not critical as to the exact positioning of the system elements. In fact, because of the nature of infra-red radiation, such transmissions can even bounce off many solid or reflective objects, and the information can still be received. The infra-red transmissions are in addition not hindered by radio frequency interference from the vehicle's ignition, or other sources.

This permits great latitude in being able to read the weighing pads from a variety of angles and positions, and allows the operator substantial flexibility in positioning the central control 20. For example, as shown in FIGS. 1 and 2, the operator would usually position himself at the front of the load or vehicle 10 and take weight readings in a straight-on manner. However, it is evident that equally good readings can be taken from the left side, right side, back, or at an angle to the vehicle 10 by turning the pads in the respective directions such that the electric eyes 26, 28, 30 and 32 of the pads and the electric eye 24 of the central control 20 can "see" each other. The electric byes 26, 28, 30, and 32 are provided on the corners of the pads so that will have a large sight angle for transmissions from the central control 20.

In general, the infra-red communications system is adapted to transmit an interrogation signal from the central control 20 to the pads 12, 14, 16 and 18, and is adapted to receive an information response from each. The central control 20 has means to distinguish whether the infra-red radiation being seen at its electric eye 24 is either the broadcast interrogation signal or an information signal from one of the pads, and in particular which one. Therefore, the central control 20 can distinguish between the pad transmissions and can ignore its own broadcast signal in case of reflections or other redundant transmissions from the other pads. Additionally, each pad includes a means for ignoring transmissions by the other pads and selecting only the interrogation signal and its address to identify a particular location. Further, the communications system comprises a means for error-free infra-red transmissions in a high ambient light environment. Such means includes the use of high intensity, low duty cycle pulses, as will be more fully explained hereinafter. Such environments would include a garage or a race track where the infra-red communications system would have to work concurrently with other optical radiation sources, such as sun light, fluorescent and/or incandescent lamps, in the background.

FIG. 3 is a pictorial representation of the display face of the central control 20 illustrating the control keys provided in the form of a touch pad 21 by which the operator controls the system. In operation, the person operating the central control 20 will press the ON/OFF key 62 to power up the control. The operator may then select from which pad, or any combination of pads, to take weight readings by pressing the particular wheel pad select keys 68, 70, 72 and 74, which are provided as pictorial representations of the locations of the left front tire, right front tire, left rear tire, and right rear tire, respectively, on a vehicle icon. After the particular weighing pads are switched on, the central control 20 is positioned in a manner so that its optical eye 24 can see or is in the sight path of each selected weighing pad. When this occurs, light-emitting diode (LED) combinations 76, 78, 80, and 82, which are associated with a wheel location by proximity to a select key, will light up with a green color. This provides a positive visual indication to the operator that each weighing pad (communication channel) selected is positively communicating. If the central control 20 is not seeing one of the selected weighing pads, then the LED combination corresponding to that pad will light up with a red color. The operator then zeros the scale by pressing the zero key 52. This is an automatic procedure where the readings from each selected weighing pad is taken with no load and stored. These readings are then subtracted from the weight readings to provide calibrated weight values.

If a weighing pad was operating properly when the weighing system was zeroed but is not now communicating properly, the LED combination associated with that pad select key will flicker with an amber color. Therefore, the LEDs will remind the operator to check to make sure that the selected weighing pads are switched on, the pads are facing in the proper direction, and are communicating properly. The status of the LED combinations and their annunciation of particular conditions of the communications channels are listed in the Table of FIG. 3D. The LCD display 23 further prompts the operator with messages to determine if the selected pads are working and, if not, whether they are turned on, if the battery is low, or if they are in the sight path of the control 20.

The load, vehicle 10, can then be positioned on the weighing pads 12, 14, 16 and 18. The LCD display 23 comprises two rows of alphanumeric digits 50, which will display the weights for all the selected weighing pads, and will also indicate what percentage of the sum of the total weight that they represent. When a weighing pad is selected, its LED combination will stay on continuously, and its two-letter name (LF, RF, LR, RR) appears on the LCD display 23, along with any other selected weighing pads. Any combination of weighing pads may be selected for display on the LCD display 23 and any number or combination of weighing pads may be actually used. The weighing apparatus also contains provision for storing in nonvolatile memory the calibration values it measures during the zeroing operation. Therefore, the weighing apparatus does not have to be rezeroed if the power is turned off, unless the number or combination of weighing pads being used is changed.

The operator can also display the weight information on the LCD display 23 in either pounds or kilograms by selecting the LB/KG key 54. The key operates as a toggle between the two modes and the LCD display 23 will indicate which measurement unit is being used. The LCD display 23 can also be backlit for night use or in unlighted or dimly lighted areas. The operator presses the light key 58 to toggle the backlighting on and off. Further, the weighing system includes circuitry for a real time clock allowing the time and date to be kept and displayed. To display the current time and date, the NEXT key 66 is pressed. The NEXT key 66 is used to select between the different weighing modes and the time/date mode. To set the appropriate time/date in the time/date mode after the NEXT key 66 is pressed, the clock mode button 64 is operated until the field in the time/date display which is to be changed begins blinking. The NEXT key 66 is then used to increment through the various possibilities until reaching the desired time and date. Further, the next key can be used to sequence through various display formats when in the weighing mode. FIG. 3A illustrates the different display formats for the LCD display 23, the sign on message of the display, and the battery low message.

For a hard copy of the various weights and cross weights, the printer 22 can be operated by depressing the print key 60. The printer 22 will automatically generate a tape to print out the time and date, each weight, total weight, cross side, front, and rear weights, and all their percentages in pounds or kilograms, depending upon the display mode selected by the LB/KG key 54. An illustrative format for this information is shown for both modes in FIGS. 3B, 3C as representative tapes.

A system block diagram of the central control 20 which communicates with the weighing pads 12, 14, 16 and 18, the touch pad 21, LCD display 23 and printer 22 is more fully illustrated in FIG. 4. The central control 20 is a microprocessor-based digital control having a microprocessor control 100 which generates digital signals to interface with its peripheral elements. Conventional interface circuits are used for the printer 22 and the LCD display 23, while a specialized interface circuit particularly adapted to digital IR communications is used for the weighing pads. The touch pad 21 and the LEDs are additionally provided with specially designed interface circuits.

The microprocessor control 100 communicates with the remote weighing pads via a peripheral communications circuit 101. The peripheral communications circuit 101 comprises a CPU interface circuit 102, a transmitter circuit 104, an array of light emitting diodes (LEDs) 105, a receiver circuit 106 and an array of photodiodes (PDs) 107.

In general, a data request signal (DATA REQ) from the microprocessor control 100 to the CPU interface 102 causes a signal FLASH to be generated to the transmitter circuit 104. The data request signal is a logic level signal which is converted into the flash signal which has the form of a series of pulse envelopes. These logic level pulse envelopes are applied to the transmitter circuit 104, which amplifies their power and voltages to drive the array of infra-red transmitting LEDs 105. The LEDs 105 generate the interrogate signal as pulse envelopes of infra-red radiation to the remote weighing pads which then answer with similar pulses envelopes of infra-red radiation. The infra-red radiation from the weighing pads is received by photodiodes 107 and converted into electrical signals. These photodiode electrical signals are transferred by the receiver 106 to the interface circuit 102 after conversion into the logic levels of the DARK signal. The DARK signal is measured as to duration and is digitized in the CPU interface 102. The DARK signal is converted into a fourteen-bit digital number and a data valid bit which can be read into the microprocessor control 100 over a databus 117. The data is read one byte at a time from the CPU interface 102 under the control of the microprocessor control 100 by generating the BYTE 1 ENABLE and BYTE 2 ENABLE signals to the CPU interface.

The microprocessor control 100 regulates the color and duty cycle of the LEDs 78, 78, 80 and 82 on the face of the central control 20 by means of a LED driver circuit 116. The LED driver circuit 116 is connected to the microprocessor control 100 by means of the databus 117 and a control line WR LEDs. When the particular state of an LED is to be changed, a data word corresponding to that state is written to the LED driver circuit 116 by transferring data over the databus 117 in conjunction with the WR LEDs signal.

In a similar manner, the control keys on the touch pad 21 of the central control 10 are input through a switch control 114 by reading two registers contained therein over the databus 117. Each byte from these two registers are read under the control of the microprocessor control 100 in conjunction with the two control signals RD PBA and RD PPB. In addition, one of the switches in the switch control 114 directly controls the backlight circuitry 112, which is connected to the LCD display 23. Alphanumeric data to the LCD display is applied from the microprocessor control 100 over an 8-bit port 115. The printer 22 is controlled by the microprocessor control 100 in a conventional manner with a serial communications connection using two bidirectional port pins for a DATA signal and a BUSY signal.

Figure 5:
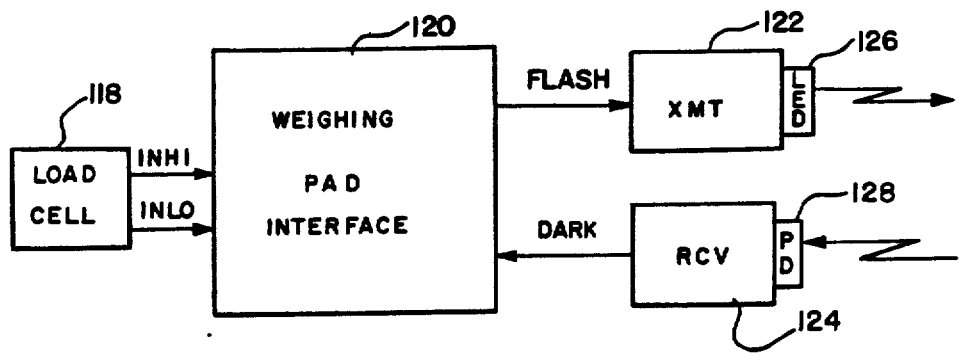
FIG. 5 is a system block diagram of the circuitry forming one of the weighing pads of the system illustrated in FIG. 1.

A system block diagram of one of the weighing pads is illustrated in FIG. 5 where a load cell 118 generates a differential voltage signal INHI-INLO which is applied to a weighing pad interface circuit 120. The weighing pad interface circuit 120 digitizes the analog weight signal and generates a digital FLASH signal to a transmitter circuit 122. The transmitter circuit 122 drives an array of light emitting diodes (LEDs) 126 to generate an information signal to the central control 20 for the particular weighing pad. This is in response to the receipt of the IR interrogate signal from the central control 20 by an array of photodiodes (PDs) 128. The interrogate signal which is a series of pulse envelopes is decoded in a receiver circuit 124. The receiver circuit 124 generates a logic level signal DARK in response to the receipt of the interrogate signal, which initiates the weighing pad interface process. In general, the FLASH and DARK signals of the weighing pads are the same signals as those provided by the central control 20. The transmitter 126 and receive 124 are also identical with those of the central controls 20.

Figure 7:
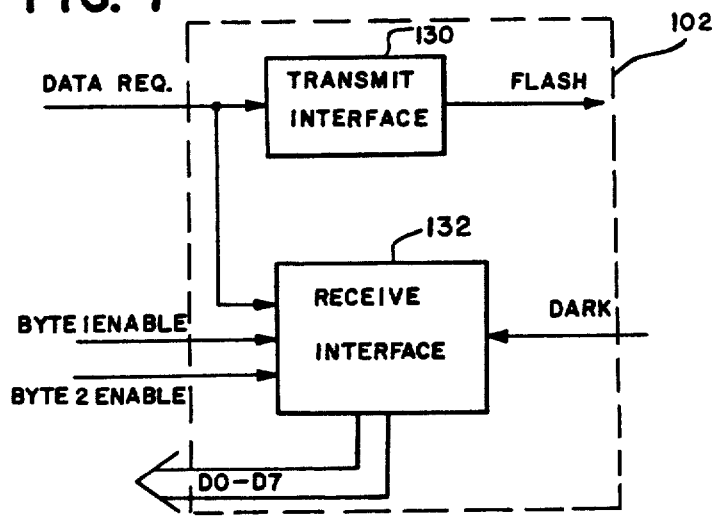
FIG. 7 is a detailed electrical block diagram of the CPU interface illustrated in FIG. 4.

FIG. 7 illustrates that the CPU interface 102 can be further broken down into a transmit interface 130 and a receive interface 132. It is seen operationally that the transmit interface 130 receives the DATA REQ signal and generates the FLASH signal from it. Further, the DATA REQ signal is applied to the receive interface circuit 132 such that an incoming infra-red radiation signal (the DARK signal) can be differentiated as to whether it is the interrogate signal or one of the information signals. The receive interface 132 generally disabled during infra-red transmissions of the interrogate signal to make this distinction. The BYTE 1 ENABLE and BYTE 2 ENABLE signals to the receive interface 132 allow the digital values of the weights from the weighing pads to be transferred to the microprocessor control 100 via the databus D0–D7.

In general operation, the interrogate signal from the central control 20 causes the weighing pad interface 120 to decode its address, convert the analog load cell signal into a digital value, and transmit that digital value via transmitter circuit 122 to the central control. The central control 20 recognizes the transmission from the weighing pad, converts the IR information signal to a digital number, and inputs the number to the microprocessor control 100 upon its command.

Figure 9:
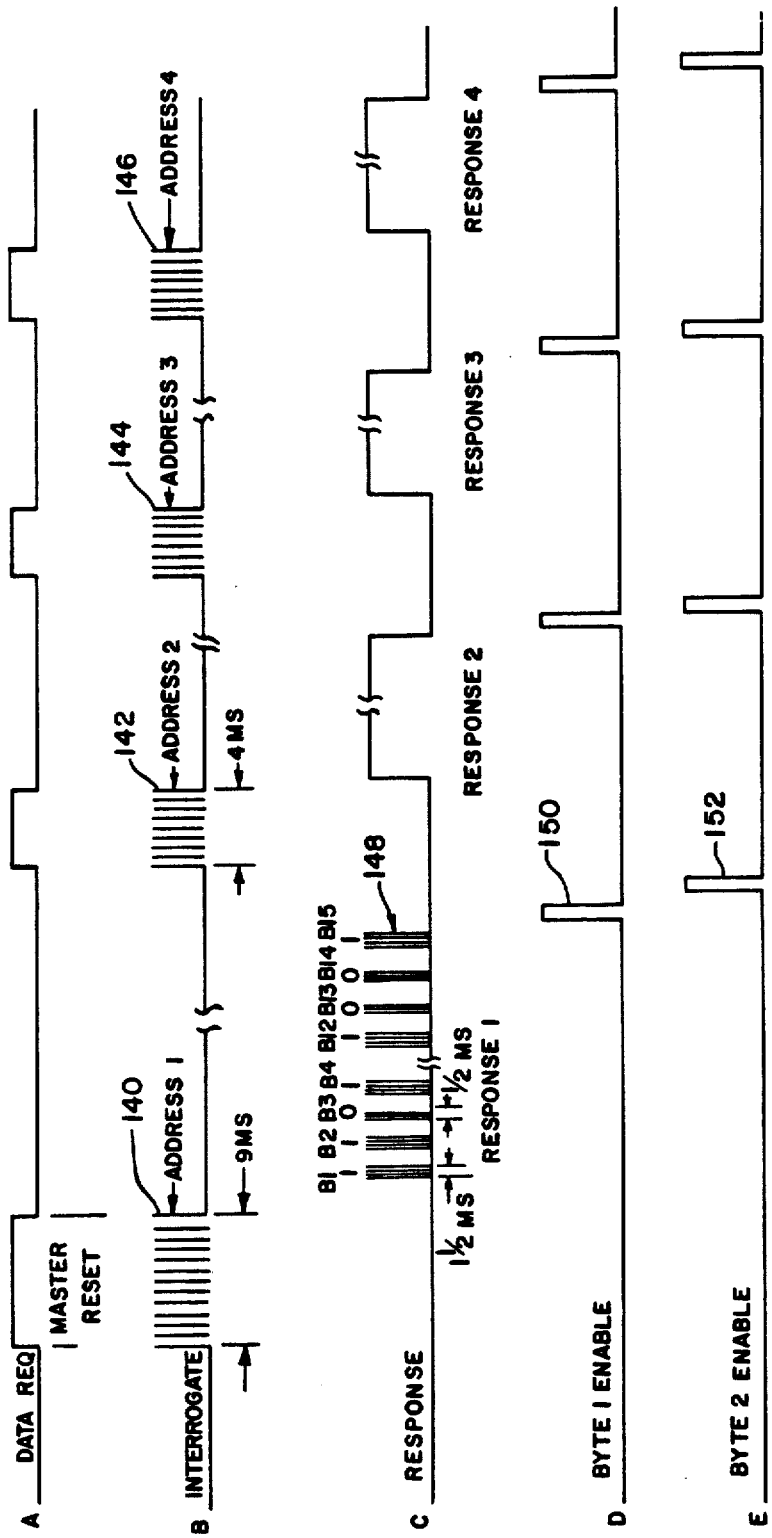
FIGS. 9A-9E are pictorial representations of timing waveforms of the various circuitry illustrated in FIGS. 4-9.

The timing of the signals for the bidirectional communications link will now be more fully described with reference to FIGS. 9A-9E. The timing of bidirectional communications from the central control 20 to each of the weighing pads 12, 14, 16 and 18 is controlled by the logic level signal DATA REQ illustrated in FIG. 9A. The DATA REQ signal is generated from an output port pin of the microprocessor control 100 under software control. The interrogate signal shown in FIG. 9B is generated from the data request signal by filling each of its pulse envelopes with short, high intensity infra-red pulses. The infra-red pulses are very short in duration and have a low duty cycle, preferably 1.5 microseconds per pulse with 30 microsecond spaces between pulses. The interrogate signal sequence in the preferred embodiment is four pulses long and comprises a master reset envelope 140 of 9 ms. and three 4 ms. address envelopes 142, 144, and 146.

The master reset envelope duration alerts all weighing pads in the system that an interrogation cycle is starting and they should reset their weighing pad interface circuits. The end of this envelope 140 indicates the weighing pad which has an address of 1 should respond with an information signal. The response time which is allowed for transferring the information signal of weighing pad 1 is 100 ms., between the master reset pulse and the next address pulse. At the time that the next address pulse 142 ends, the second weighing pad will respond to the request and likewise for the third and forth weighing pads. It is evident that the system is easily expandable by providing additional address pulses for each new communication channel desired.

The response of the respective weighing pads is illustrated in time sequence with the interrogate signal in FIG. 9C and is again a pulse envelope 148 containing many short duration, high amplitude bit groups. The envelope comprises several bit groups, B1-B15, of pulses of either 1½ ms. or ½ ms. depending on whether the bit in the sequence is a zero or a one. The response of each pad is thus a 15-bit serial sequence. In general, a one bit has been chosen as a bit group of 1½ ms. duration, while a zero bit has been chosen as a bit group of ½ ms. duration, although this designation is entirely arbitrary. In a 5 ms. period after the end of each response and before the beginning of a new address envelope, the microprocessor control 100 will generate in sequence the BYTE 1 ENABLE and BYTE 2 ENABLE pulses, illustrated in FIGS. 9D and 9E, respectively. These pulses will cause the decoded information signal to be input in a digital manner to the microprocessor control 100.

This IR communications system thus provides a means for differentiating between different weighing pads and the interrogate and response signals. Further, a digital communications system is provided where the bit values can be easily determined by envelope duration. The circuitry involved is synchronous with the microprocessor control 100, but allows the microprocessor control to regulate when and how often the input of data from the weighing pads is necessary. Also, the data has been digitized by the communications circuitry without the necessity of having to take time to decode such in the microprocessor control 100. The peripheral interface circuitry does all the decoding and the microprocessor control 100 receives a digital value in response to its request for weight data.

Figure 8:
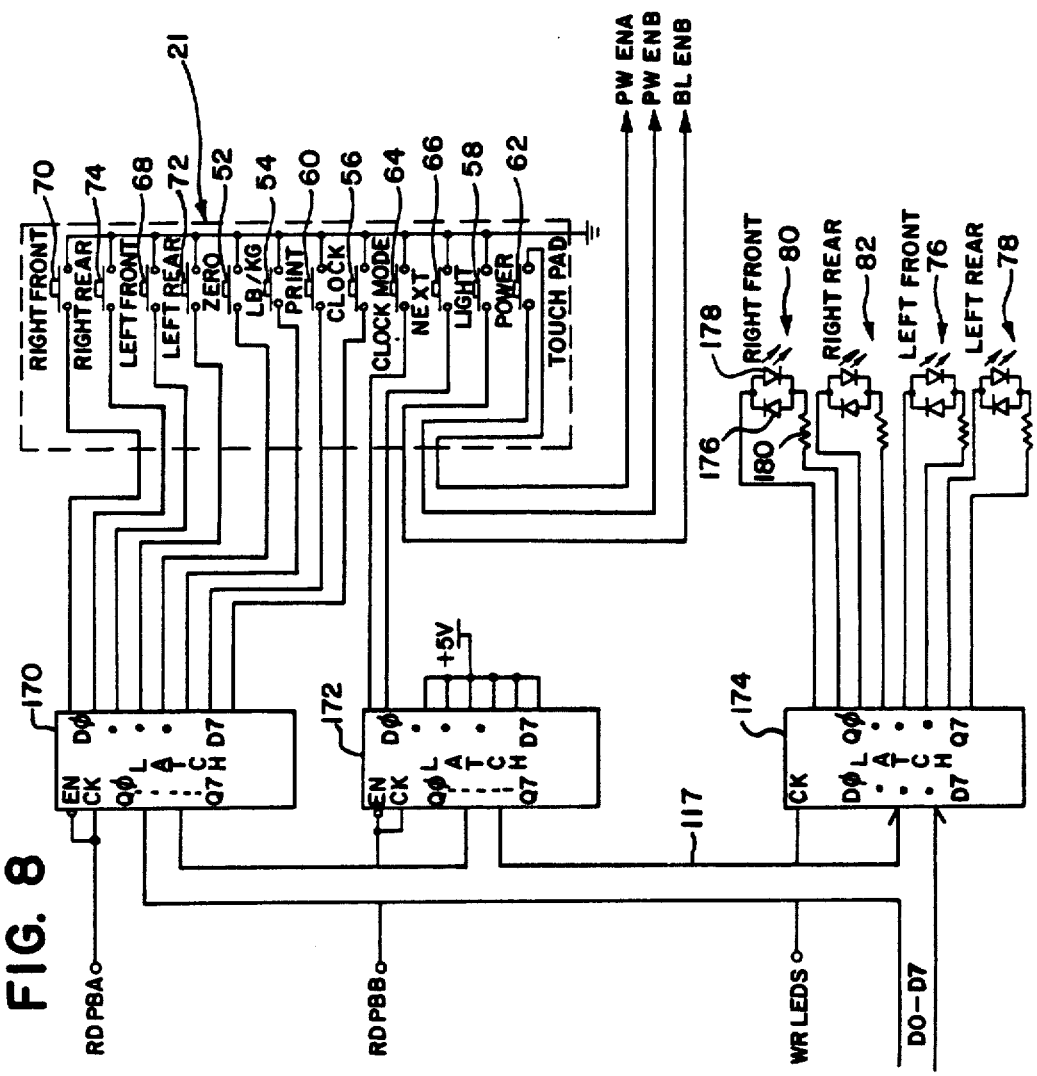
FIG. 8 is a detailed electrical schematic of the switch control and LED driver circuit illustrated in FIG. 4.

FIG. 8 illustrates the detailed circuitry for the switch control 114 and LED driver circuit 116. The switch control 114 is integrated with the touch pad 21 and includes all the control keys 52-74 and two digital 8-bit latches 170, 172. The inputs D0-D7 of the latches 170, 172 are connected respectively to one terminal of the control keys 52-56, 60, 64-74 whose other terminal is connected to ground Unused inputs D2-D7 of latch 172 are tied to a positive voltage +5 V. The light control key 58 enables the back lighting circuit 112 (FIG. 4) with the signal BL ENB while power to the central control 20 is enabled by momentarily connecting the two terminals of the power key 62 together to generate the signals PW ENA, PW ENB. The outputs Q0-Q7 of latches 170, 172 are coupled to the data bus D0-D7 of the microprocessor control 100.

The microprocessor control 100 generates the two control signals RD PBA, RD PBB to the clock CK and enable *EN inputs of the latches 170, 172 respectively. In operation, when the microprocessor control 100 desires to sample the state of the touch pad keys, the latches 170 and 172 are strobed with the signals RD PBA, RD PBB. Depending on whether the keys are depressed, a logical zero (ground-key depressed) or a logical one (floating-key not depressed) is loaded into the latches 170, 172 and enabled onto the data bus for reading by the control 100.

In a similar manner, the LED driver circuit 116 comprises an 8-bit latch 174 having its inputs D0-D7 coupled to the data bus 117 and its outputs Q0-Q7 paired with each LED combination 76-82. The latch outputs Q0-Q7 are always enabled and data written from the microprocessor control 100 over the data bus 117 remains applied to the LEDs. Data from the microprocessor control 100 is strobed into the latch 174 by means of the control signal WR LEDs applied to the clock input CK of the latch. Each LED combination, for example combination 80, contains one green diode 176 and one red diode 178 which are oppositely poled in parallel and connected at one junction to a current limiting resistor 180. The current limiting resistor 180 and the other LED junction are connected to two outputs, in the example Q0, Q1 of the latch 174. The outputs Q0-Q7 of the latch 174 will either source current (logical one) or sink current (logical zero) depending on the data value written into the latch. Thus, with the configuration shown, the LED combination 80 can either be turned off (00,11), turned on to conduct such that the green diode is on (01), or turned on to conduct such that the red diode is on (10). Thus, the microprocessor control 100 by determining the status of the communications channels (weighing pads) can alert the operator to their operation by writing corresponding data to latch 174 to produce different colors.

Further, by controlling the timing of the writing of the data, the microprocessor control 100 can cause the LED combinations 76-82 either to remain on steady or to alternate off and on at some frequency, i.e., make them blink. Still further, by controlling the duty cycle of the on and off times of both the red and green LEDs simultaneously, an amber color can be produced. The status information previously described for the communications channels can thereby efficiently and easily be generated by the circuit illustrated, providing the operator with a visual annunciation which can be readily interpreted.

The receiver circuitry shown in FIG. 10 will now be more fully described with reference to that detailed schematic. The receiver circuitry for the central control 20 and each weighing pad is identical, and only one circuit will be described for the purpose of clarity. The IR transmission signals enter the circuit by being detected by a series of photo-diodes 200 (PDs) connected in parallel. Such photo-diodes 200 are sensitive to infrared radiation and will generate source current when impinged upon by such radiation. The diodes 200 are reversed biased by applying a positive voltage V+ to their cathode terminal and by having their anode terminal connected through an inductor 201 to ground.

The PDs 200 are generally sensitive only to radiation in the IR spectrum, approximately 680 n meters, and are provided with a lens forming part of the electric eye which also acts partially as an IR filter. This makes the receiver noise resistant to much optical radiation outside the IR band. However, many optical sources such as incandescent and fluorescent lamps, sunlight, etc., still generate considerable IR radiation, but the intensity of the ambient radiation is at a relatively low frequency such that it will look like a DC bias on the PDs 200. This DC bias will generate photocurrents but they will be shunted to ground by the low DC impedance of inductor 201. The pulse envelopes, on the other hand, are very high in frequency, 1½ microseconds/pulse, and find the inductor 201 a very high impedance. Moreover, the internal capacitance of the inductor 201 causes it to ring when the high frequency IR pulses are applied. These operations allow extended operations in high ambient light conditions, even where there is a flickering radiation (fluorescent lamp) because of the frequency difference.

The pulse envelopes of the IR transmissions are capacitively coupled to a first stage of an amplifier 202. The output of the first stage at the collector of NPN transistor 204 is coupled to the base of the second stage of an amplifier 206. A third stage of amplification is provided by PNP transistor 209 which feeds a collector resistor 213 for developing a voltage at the inverting input of operational amplifier 211. Operational amplifier 211 serves as a comparator having a threshold voltage presented at its noninverting input. The pulses from the comparator 211 are applied to an integrating capacitor 212 which turns the pulses into a square wave having a duration equal to the envelope of each group of pulses.

The capacitor 212 has a fast discharge path through the output of comparator 211 when it sinks current and a slow charging path through resistor 215. The detected pulses which are in excess of the threshold, thus, maintain the capacitor 211 reset. The output voltage of comparator 214, the DARK signal, remains low during the time pulses are received because the voltage on capacitor 212 will be below its threshold. The DARK signal is an inverted signal having its high logic level as representative as no IR radiation input and its low logic level representing the duration of each envelope for a group of transmitted pulses.

Figures 10, 11:
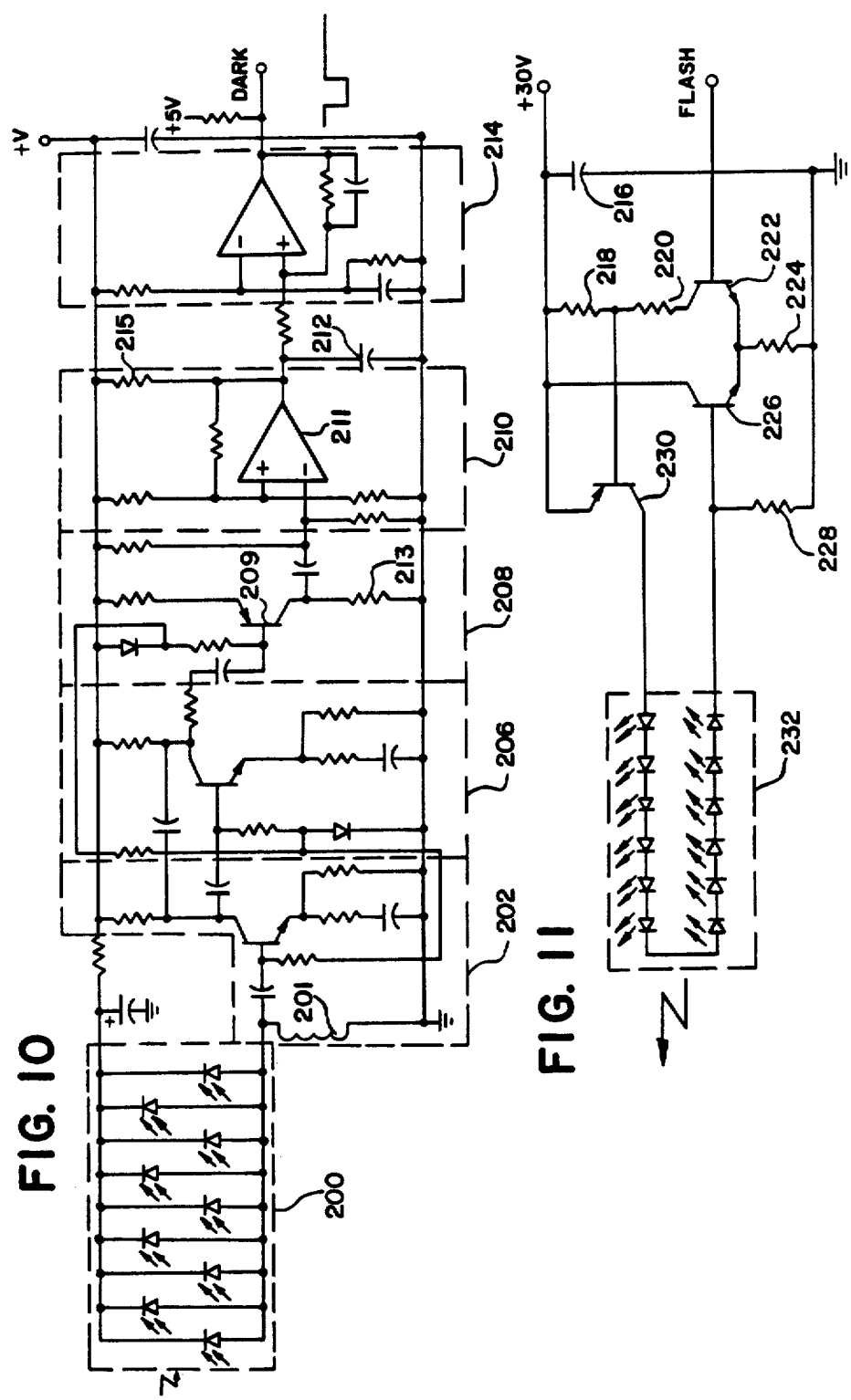
FIG. 10 is a detailed electrical schematic of the receiver of the central control illustrated in FIG. 4 and the receiver of the weighing pad illustrated in FIG. 5.
FIG. 11 is a detailed electrical schematic of the transmitter of the central control illustrated in FIG. 4 and the weighing pad illustrated in FIG. 5.

The detailed description of the transmitter will now be more fully set forth with respect to the electrical schematic in FIG. 11. The transmitters of the central control and each weighing pad is the same and only one will be described for the purpose of clarity. The transmitter consists of a operational amplifier formed of two PNP transistors 222 and 226 whose output controls a drive transistor 230. The drive transistor 230 powers a plurality of serially connected light emitting diodes 232 through a connection between +30 V and ground. The array of light emitting diodes 232 (LEDs) are current driven devices which output electromagnetic radiation in the infra-red spectrum. The higher the current, the more intense the radiation will be until they saturate. A beam can be formed by the placement of the LEDs in an array pattern.

The input driving signal for the operational amplifier is the FLASH signal to the base of the transistor 222. The transistor 222 has a pair of collector resistors 218 and 220 connected between the source of voltage +30 V and the collector of the transistor. The emitter the transistor 222 is connected to the return through an emitter resistor 224. The mirror image transistor 226 has its emitter connected to the resistor 224 and its collector connected to the source voltage +30 V. A load resistor 228 is connected between the base and connection to provide a bias voltage for transistor 226. A filter capacitor 216 is further connected between the source voltage +30 V and common.

In operation, when the FLASH signal makes a transition to a high logic level, transistor 222 is turned on, thereby providing a bias path for transistor 230. The current from the source voltage +30 V is thereby passed through the LEDs 232 and returned through resistor 228. Transistor 226 acts as a regulator to assure a measured current pulse across the LEDs 232. The FLASH signal is a logic level signal of a predetermined voltage and the operational amplifier attempts to match this voltage at the base of NPN transistor 226. The circuit thereby provide a predetermined current through the diodes, even if one is burned out, which is the same for all the diodes. This operation produces a sharp, intense pulse of IR radiation which is relatively similar from each diode.

Figure 6:
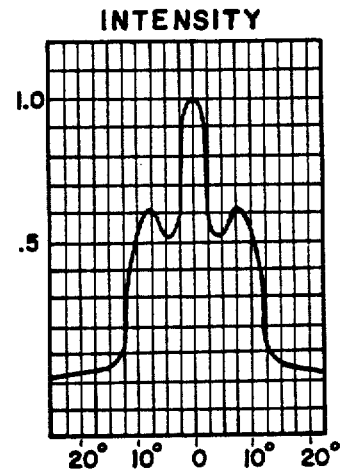
FIG. 6 is a pictorial graphic representation of the intensity pattern for one of the LEDs of the transmitter circuit of the central control and weighing pads illustrated in FIGS. 4 and 5, respectively.

The transmission coverage of the LEDs 232 can be enhanced by forming them into an array or beam. FIG. 6 illustrates a typical intensity pattern for one of the diodes 232. It is seen that the intensity pattern falls to 50%. of maximum 10° off the focal center of the diode. The diodes can then be configured to have their 50% points overlap each other by positioning them in arrays having 10° spacings, such as semicircles or circular arrays, thereby forming an intense distribution pattern.

The detailed circuitry comprising the CPU interface 102 is more fully detailed in FIGS. 12 and 13. The circuitry (FIG. 12) which is used to generate the FLASH signal from the data request signal, DATA REQ, includes a timer 406 configured as a free running oscillator whose pulses are asymmetric. The on time of astable 406 is much less than the off time producing narrow pulses of a low duty cycle. The pulses from astable 406 are inverted and shaped by invertor 408 before being applied to one input of an AND gate 410. The DATA REQ signal is applied through resistor 404 to the other input of the AND gate 410 to gate the pulses from the free running oscillator on and off depending upon the logic value of that signal. The output of the AND gate 410 is a series of pulse envelopes containing packets of the oscillator pulses where each envelope duration is determined by the logic levels of the DATA REQ signal. The pulse envelopes of the FLASH signal are applied to the transmitter 104 to convert the logic level signal into high power current pulses used to drive the LED array 105.

Conversely, the information signals are received and transferred to the microprocessor control 100 by the receive interface circuit 132 (FIG. 13). The data bits received through the receiver circuit 106 are in form of pulse groups of different duration transmitted by the weighing pads. This signal, DARK, is a square wave representing the 14-bit weight value from one of the pads. The signal DARK is inverted twice by inverters 414, 416 for shaping before being applied to one input of an OR gate 418. The DARK signal normally propagates through the OR gate 418 to an OR gate 420 where the envelopes are applied to an operational amplifier 422 and its related circuitry configured as an integrator 423.

A high logic level for the DARK signal discharges a capacitor 425 of the integrator 423 rapidly to zero while a low logic level causes a ramp voltage to appear at the output of the integrator. This ramp voltage indicating a bit is present is compared to a first threshold of a comparator 422 and a second threshold of a comparator 424. The first threshold indicates a pulse group duration corresponding a "zero" bit and the second threshold, which is larger than the first threshold, indicates an envelope duration corresponding to a "one" bit.

The output of the first comparator 422 is used to enable AND gate 426 and allow pulses of the DARK signal to propagate through to become a clock signal. The clock signal also passes through an OR gate 428 and is applied to the clock inputs CK of two serial to parallel converter chips 430, 432. The clock signal is thus generated for either a "zero" or a "one" bit. Which bit is input to the data input DATA of the serial to parallel converter chip 432 is determined by the logic level output from the second comparator 424. If the output of the second comparator 424 is a low level logic signal, then a "zero" bit is shifted into the converter. Conversely, if the output of the second comparator 424 is a high logic level, then a "one" bit has been detected and such is shifted into the converter.

The microprocessor control 100, subsequent to a time (100 ms.) at which all the data bits of a response should have been received, first generates the pulse BYTE 1 ENABLE which is applied to the enable input EN of the first converter chip 432. This pulse causes the chip to load its contents onto the data bus 117 where they can be read into memory. Thereafter, the microprocessor control 100 generates the pulse BYTE 2 ENABLE which is applied to the enable input EN of the second converter chip 430. The second pulse causes the second byte of the data to be placed on the data bus 117 where it can be read into memory.

The receive interface circuitry 132 further includes two control bistables 434 and 436. The bistables 434, 436 are clocked D-type bistables with their D inputs tied to a zero logic level. The DATA REQ signal is applied to the set input S of bistable 436, and the clock input CK of bistable 434 after inversion by invertor 438. The BYTE 1 ENABLE signal is applied to the set input S of bistable 434 while the BYTE 2 ENABLE signal is inverted by invertor 440 and applied to the clock input CK of bistable 436. The Q output of bistable 436 is applied to one input of OR gate 428 and the Q output of bistable 434 is applied to one input of OR gate 420.

The control bistables 434, 436 act to disable OR gates 420, 428, respectively when their outputs are a high or "one" logic level and to enable OR gates 420, 428, respectively when their outputs are a low or "zero" logic level. In operation, the BYTE 2 ENABLE signal resets control bistable 436 disabling OR gate 428 and thereby the clock to the serial to parallel converter. The BYTE 1 ENABLE signal sets control bistable 434 disabling OR gate 420 and thereby the integrator 423. Thus, after information from one channel is read in, the microprocessor control 100 disables the receive interface 132 until the DATA REQ signal makes a low to high logic transition.

The low to high transition is at the end of master reset pulse or one of the address pulses, thereby idling the receive interface during their presence so that it cannot detect the IR transmissions of the interrogate signal. When the transmission has ended, the low to high transition of DATA REQ sets control bistable 436 and resets control bistable 434 to enable OR gates 420, 428 to receive the information signal from the weighing pad which is addressed. Monostable 460 disables OR gate 418 for a short time upon the FALLING edge of each pulse group of the DARK signal. The DARK signal may have some ringing on a falling edge and monostable 460 holds OR gate 418 low for a short period of time to filter such ringing from the circuit.

Figure 14:
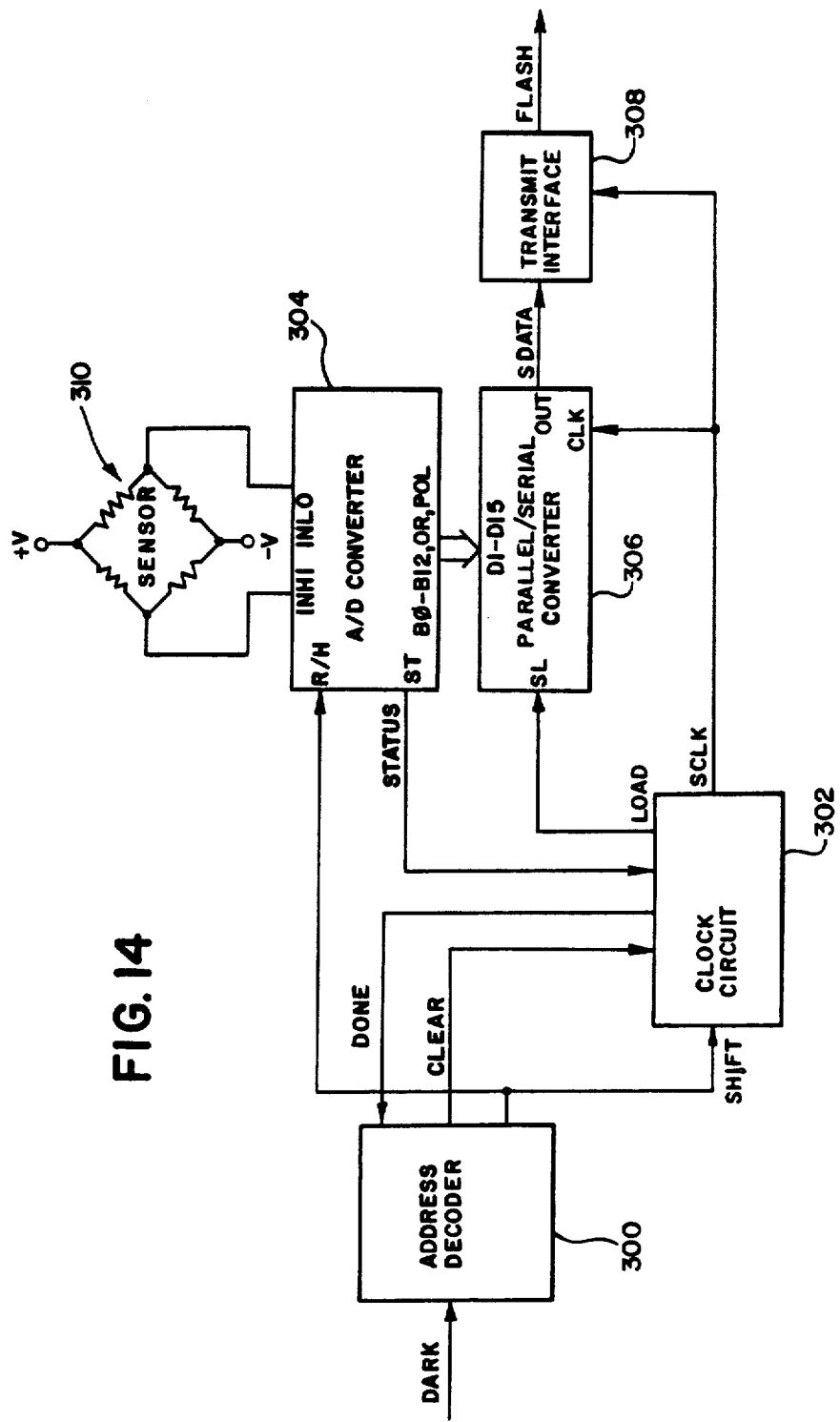
FIG. 14 is a detailed electrical block diagram of the weighing pad interface illustrated in FIG. 5.

FIG. 14 illustrates a detailed block diagram of the circuitry for each weighing pad interface 120. Each weighing pad interface 120 has similar circuitry and only one detailed description of such will be provided for the purpose of clarity. The DARK signal from the receiver 124 (FIG. 5) is applied to an address decoder 300 to determine the durations of the master reset pulse and address pulses. The address decoder 300, when it determines that a master reset pulse has been received, generates a signal CLEAR to reset its own circuitry and the circuitry of a clock circuit 302. Further, the address decoder 300, when it determines an address bit identifies its channel will produce an enabling signal SHIFT to the clock circuit 302. The SHIFT signal is also applied to the run/hold input R/H of an analog to digital converter 304 whose analog inputs INHI and INLO are received from the measurement nodes of a load cell 310. The parallel outputs B0-B12, OR, and POL of the A/D converter 304 are applied to the inputs D1-D14 of a parallel to serial converter 306.

After the CLEAR signal has been generated by the address decoder 300 and the receive circuitry recognizes its address by generating the SHIFT signal, the A/D converter 304 will convert the analog voltage of the load cell 310 into a digital number. After the digital conversion is complete, the A/D converter 304 will reply to the clock circuit 302 with the signal STATUS indicating that the data is ready. Upon sensing the STATUS signal, the clock circuit 302 will apply an enabling signal LOAD to the shift/load input S/L of the parallel to the serial converter 306. This signal will cause the digital value from the A/D converter 304 to be loaded in parallel into the parallel to serial converter 306.

When the digital value has been transferred, the clock circuit 302 will generate a serial clock signal SCLK which is applied to the clock input CLK of the parallel to serial converter 306 and to a transmit interface 308. The serial clock signal SCLK causes the data held in the parallel to serial converter 306 to be shifted out as a serial data signal SDATA which is received by the transmit interface 308. The transmit interface 308 converts the serial data into the signal FLASH which is composed of short duration pulse groups of different durations depending upon whether the bit values are one or zero. The FLASH signal is then applied to the transmitter 122 to convert the logic levels of that signal into high power IR radiation for transmission to the central control 20.

With reference to FIG. 15, the detailed circuitry for the address decoder 300 will now be more fully described. The DARK signal is input to the inverting terminal of operational amplifier 312 which functions as an integrator. When the DARK signal is at a high logic level, the capacitor 313 is discharged. When the DARK signal makes a transition to a high logic level, the integrator output voltage begins to ramp in a linear fashion. This linear ramp voltage is applied to two comparators formed from operational amplifiers 314 and 316. Each comparator measures the durations of the pulse envelopes which are input from the DARK signal and provides an output based on whether a master reset pulse or an address pulse is decoded.

The comparator using operational amplifier 316 detects whether there is any valid pulse, either the master reset pulse or any one of the other address pulses 2-4, by determining if the pulse is 4 ms. or longer. The output from the operational amplifier 316 enables an AND gate 318. The DARK signal is applied to the other input of AND gate 318 and thereby passes through the gate when the threshold of the comparator 316 is exceeded. This clock pulse is again inverted in inverter 319 before being applied to the clock input CK of an 8-bit counter 322. Thus, the counter 322 is clocked every time that the address decoder 300 circuit receives either a master reset pulse or an address pulse.

The second comparator utilizing operational amplifier 314 detects the amplitude of the ramp voltage of integrator 312 which is representative of the duration of the master reset pulse. When such pulse width (9 ms.) is detected, the output of operational amplifier 314 makes a transition to a low logic level which is then propagated as the CLEAR signal. The CLEAR signal is applied to the load input LD of the counter 322 and causes a digital value, selectable by jumpers 320 coupled to the inputs INA, INB, to be preset in the counter.

In operation, the address decoder 300 has the counter 322 preset to a particular number by means of the CLEAR signal and then counts each pulse including the master reset pulse detected from the DARK signal. By presetting the counter 322 to a value which is its address number of counts away from overflow, the counter can be made to generate an output from its carry output CRY when a particular address bit is received. For example, the counter 322 of weighing pad 1 would be set to binary 15 such that the master reset pulse will clock the counter and cause an overflow signal from the CRY output. Similarly, counters for weighing pads 2, 3 and 4 would be preset to binary 12, 13 and 14, respectively. The carry output CRY becomes the enabling SHIFT signal to the clock circuit 302 and to A/D converter 304. The CRY signal is further fed back through diode 324 to disable AND gate 318 to prevent further clocking of the counter and through diode 325 to disable the integrator 312. The SHIFT signal remains at a high logic level until the counter 322 is reset by means of a DONE signal applied through invertor 323 to the clear input CLR of the counter.

The detailed circuitry for the clock circuit 302 will now be more fully described with reference to FIG. 16. The primary functions of the clock circuit 302 are to load the parallel to serial converter, to generate the serial shift clock signal SCLK to shift the data out from the parallel to serial converter, and to time the data output from the transmit interface 308. The clock circuit 302 includes a timer 332 configured as a free-running oscillator. The oscillation is asymmetric has a frequency of twice the shift clock signal 2SC which is divided down into the shift clock signal SCLK by a D-type bistable 334. The output from the astable 332 is inverted in an invertor 333 before being applied to the clock input CLK of the bistable 334. The bistable 334 has its *Q output tied to its D input and is configured as a trigger type bistable, thus dividing in half the frequency of the signal input to its clock input CLK. This signal labelled SCLK is the shift clock and the primary bit rate for the transmission of the data signal from each of the weighing pads.

The inversion of this signal *SCLK which is generated by the Q output of bistable 334 is applied to the clock input CK of a 16-bit binary counter 326. The counter 326 is incremented for every shift clock pulse and counts the 15 bits of data to be shifted out. Once this has been accomplished, the counter overflows from its CRY output and generates the DONE signal to clear the address counter 322 in the address decoder 300. When the DONE signal clears the address counter 322 of the address decoder 300, the SHIFT signal makes a transition to a low logic level and disables the clock until the next master reset and address bits enable the circuit. The counter 326 is initially cleared by the CLEAR signal being applied to its clear input CLR.

The control of the clock circuit 302 is provided by a NAND gate 330 whose output is tied to the set input S of the bistable 334 and whose inputs are the SHIFT and CLEAR signals, respectively. Prior to the time that each weighing pad is interrogated, the SHIFT and CLEAR signals are at a low logic level. This causes the output of NAND gate 330 to be at a high logic level and to hold the bistable 334 in a set state. However, when the SHIFT signal is combined with the CLEAR signal, after the decoding of a master reset or other pulse representing the address of the particular weighing pad, the output of NAND gate 330 will make a transition to a low logic level. This causes the set signal to be removed from the bistable 334 thereby enabling the astable pulses to produce the shift clock signals SCLK.

The clock circuit 302 further includes a D-type bistable 328 whose *Q output is tied back to its D input through a pair of diodes. The *Q output of the bistable 328 is used to generate the LOAD signal. The input to its clock input CLK is the inverted version of the STATUS signal of the A/D converter 348. The DONE signal is applied to the set input S of the bistable 328 while the output of NAND gate 330 is combined with the feedback from the Q output and applied to its D input. The bistable 328 operates by being set by the DONE signal until a new cycle is started by the clearing of the counter 326. When the SHIFT signal starts the analog to digital conversion, it also produces a low logic signal at the output of NAND gate 330. Therefore, when the STATUS signal clocks the bistable 328, a "zero" will be propagated from the D input to the Q output of the device, thereby producing a "one" on the Q output which becomes the LOAD signal. The analog to digital converter 304, responding to an indication that the conversion has been completed, will cause the value of that conversion to be loaded into the parallel to serial converter 306.

The detailed circuitry of the transmit interface 308 is more clearly shown in FIG. 17. A PNP transistor 342 is used to generate the signal FLASH by combining two logic signals at the base of the transistor. In general, the base of transistor 342 receives a series of pulses from an asymmetric free running oscillator 340. The oscillator 340 output is connected to the base through resistor 341 and causes the transistor 342, configured as a constant current source, to generate the FLASH signal. In general, the pulses output from the oscillator 340 drive the transistor into saturation except when the device is reset or when the transistor 342 is driven by the output of NAND gate 338. NAND gate 336 combines the input of the serial data SDATA from the parallel to serial converter 306 and the two times shift clock signal 2SC from oscillator 332. The output of NAND gate 336 is applied to one of the inputs of NAND gate 338 along with the shift clock SCLK which is applied to the other input. The combination of these signals output from NAND gate 338 comprises a signal which gates the PNP transistor 342 at its base, and is further applied to the reset input R of the oscillator 340 through invertor 341.

When the combined signal is a low logic level, its inversion causes the oscillator 340 to halt generating pulses by holding it in a low logic level condition. This action causes a group of pulses which is as long as a "zero" pulse group to be generated from the transistor 342. Conversely, when a high level is generated from gate 338, it is inverted in gate 341 and removes the reset from oscillator 340. The oscillator output is therefore free to generate a series of pulses through the transistor 342. In this manner, a series of pulse groups are generated of two distinct durations. If the data bit from the signal SDATA is a "1", then the pulse group of the data bit is 1 ½ ms., while if the data bit is a "0", then the pulse group is ½ ms. The data rate which is determined by the shift clock SCLK is approximately 2 ms. per data bit.

Figure 18:
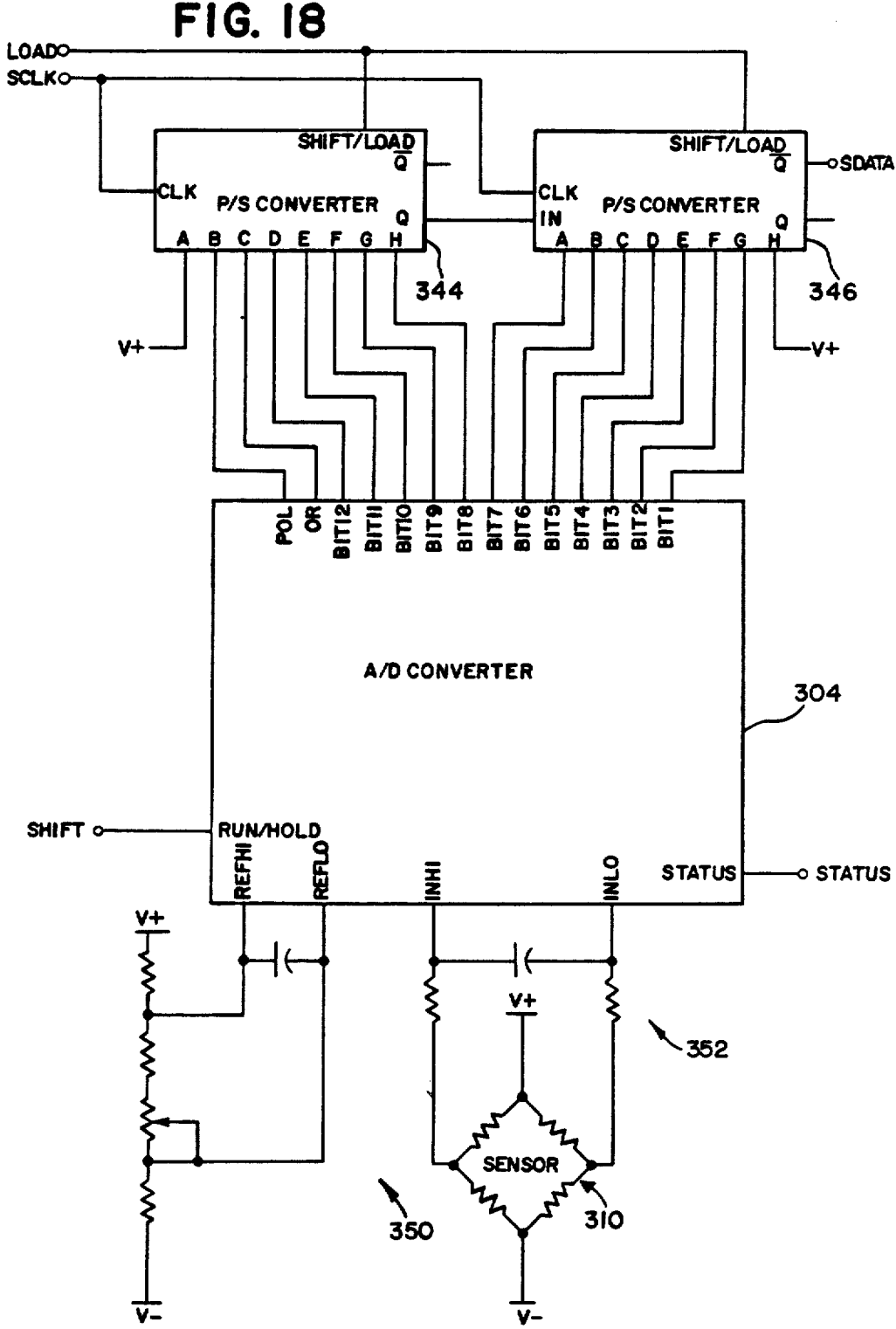
FIG. 18 is a detailed electrical schematic of the A/D converter and the parallel/serial converter illustrated in FIG. 14.

FIG. 18 is a detailed electrical schematic of the A/D converter 304 and parallel to serial converter. The weight from each weighing pad is developed from a load cell 310 which has a resistor bridge connected between differential voltages +V, −V and the sensor output. At least one of the resistors is pressure or weight sensitive and unbalances the bridge when a load is placed on a pad. The analog output signal from the sensor 310 is filtered by a low pass filter 352 before being input to the terminals INLO, INHI of A/D converter 304. A ratiometric reference voltage from circuit 350 is applied to the inputs REFLO, REFHI of the A/D converter 304.

The analog signal from the sensor 310 is converted into a 12-bit digital value when the SHIFT signal makes a low to high logic transition. The conversion is complete when the A/D converter outputs the signal STATUS. A low logic level on the SHIFT signal will cause the digital value of the conversion to be held on the outputs BIT1–BIT12, along with a polarity bit POL and an overrange bit OR.

The parallel to serial converter comprises two IC chips 344, 346 which load the 14-bits from the A/D converter 304 into the 16-it shift register when the LOAD signal makes a high to low logic transition. Low bit A of chip 344 and high bit H of chip 346 are loaded with a "1" to complete the parallel loading. The low bit A is termed the data valid bit. The system can tell that information has been transmitted validly when this bit is set because the corresponding receiver register is cleared before data transfer. If this bit is not received as a "1", then the system will be alerted that the channel or pad is not communicating properly. When the LOAD signal is a high logic level, the shift clock signal is used to transmit the digital data, the polarity, overrange, and data valid bits in a serial sequence as the signal SDATA.

Figure 20:
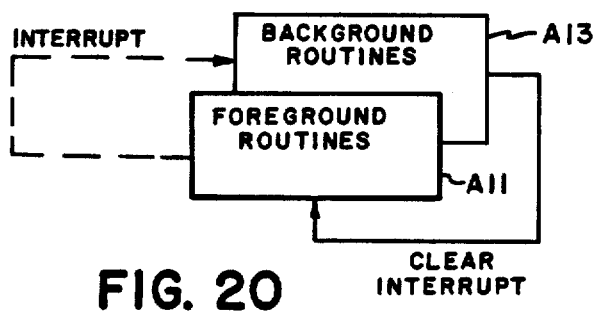
FIG. 20 is a system flow chart of the software which operates the microprocessor control illustrated in FIG. 4.

The system flow chart for the software which is adapted to run the microprocessor control 100 is more fully shown in FIG. 20. In that figure, the software is shown as a group of foreground routines A11 and a group of background routines A13. In general, once the microprocessor is started, the foreground routines A11 are executed sequentially until an interrupt occurs. When an interrupt occurs, the microprocessor control 100 transfers control to the background routines A13. The interrupt is processed in the background routines A13 until cleared, and then program control is returned to the foreground routines A11 at the next instruction the microprocessor would have executed were it not interrupted. Prioritization of interrupts is further provided where a higher order interrupt will finish before one of lessor priority.

Figure 21:
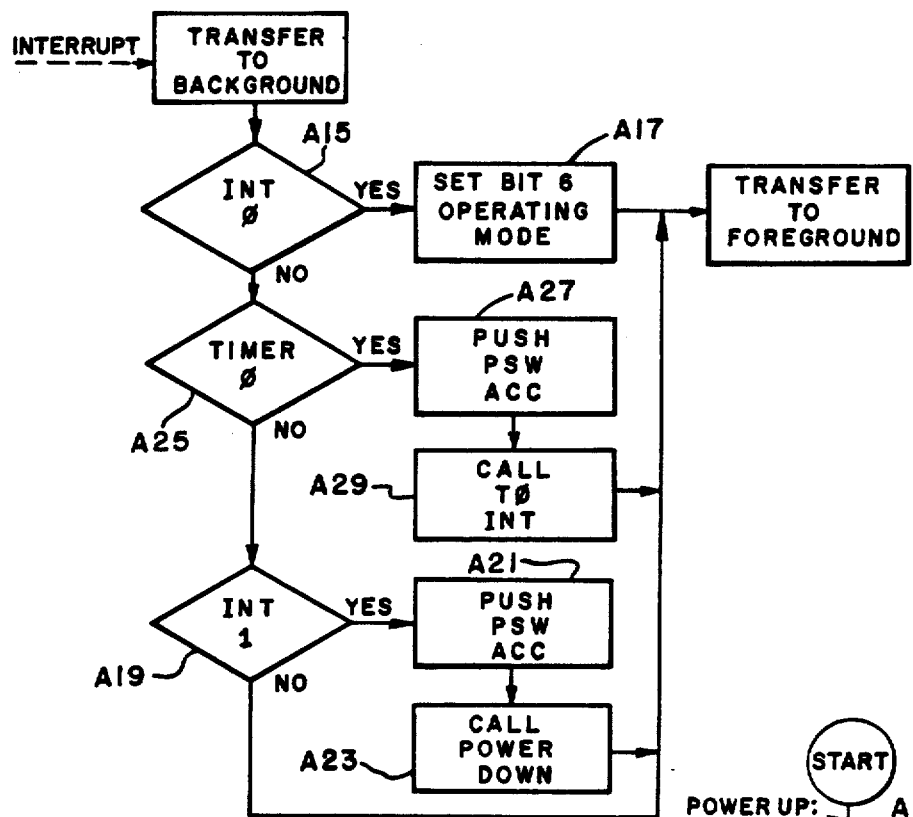
FIG. 21 is a detailed system flow chart of the background routines illustrated in FIG. 20.

FIG. 21 illustrates a system flow chart of the background routines A13 and interrupt structure. When an interrupt occurs, the transfer to background begins a sequence to determine the priority and the type of interrupt that has occurred. There are several hardware interrupts for the microprocessor, interrupt 0 and interrupt 1. If a hardware interrupt 0 has occurred, as determined by block A15, then Bit 6 of the location OPR MODE is set in block A17, before the program returns to the foreground. BIT 6 is an indicator that a low battery interrupt occurred, and flags this condition.

Interrupt 1 is a hardware interrupt indicating that there is a power down condition which is handled in block A19. When a power down condition occurs, the program status word (PSW) and the accumulator (ACC) are stored to the stack in block A21, and the routine POWER DOWN is called in block A23 to begin a controlled sequence for storing data. This allows the present data in the random access memory for each weighing pad to be stored in a non-volatile memory so that it is not lost. One group of parameters relating to system parameters which is stored is the zero values for the weighing pads so that a rezeroing operation will not be necessary if power is turned off. After the power down routine has finished, a transfer to foreground occurs to complete the operation.

A software timer 0 is used as a software interrupt to allow a number of real time input/output functions to be processed concurrently with the foreground. The timer 0 interrupt is detected by block A25 and causes the program status word and accumulator to be stored in block A27. A T0 interrupt subroutine is then called in block A29 to process the interrupt. When finished, the T0 interrupt routine will cause the microprocessor control 100 to be transferred to the foreground routines A11. The T0 interrupt routine A29 is used to write the LED latch, read the key latches A and B, write the interrogate signal, read the pad data registers, and time the LED display.

Figure 22:
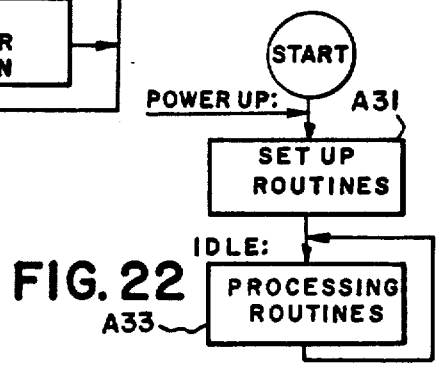
FIG. 22 is a detailed system flow chart of the foreground routines illustrated in FIG. 20.

The foreground routines A11 as better illustrated in FIG. 22, comprise a group of setup routines A31 which are executed every time that the system is powered up. The set up routines, upon completion, transfer control to a idle loop A33, which calls all of the other foreground routines. The idle loop has software to process the key flags which are set by data from the key latches, software to process and display the pad data in the manner desired by the operator, software to display error messages for system control, and software to process the system modes such that the right data is written to the LED latch. In general, the program spends most of its time the idle loop.

Figure 23A:
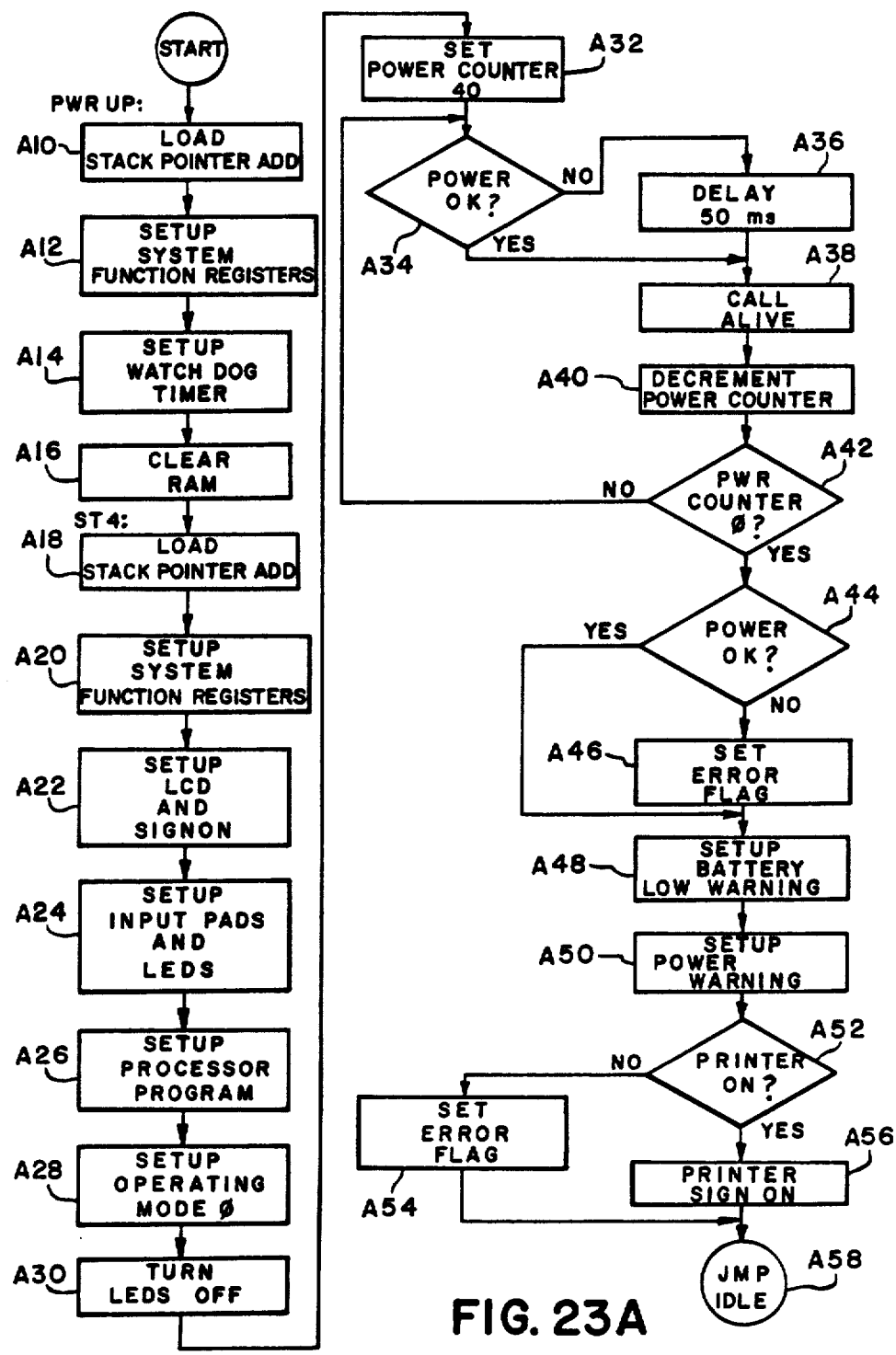
FIGS. 23A-23F are a detailed flow chart of the set-up and processing routines illustrated in FIG. 22.
Figure 23B:
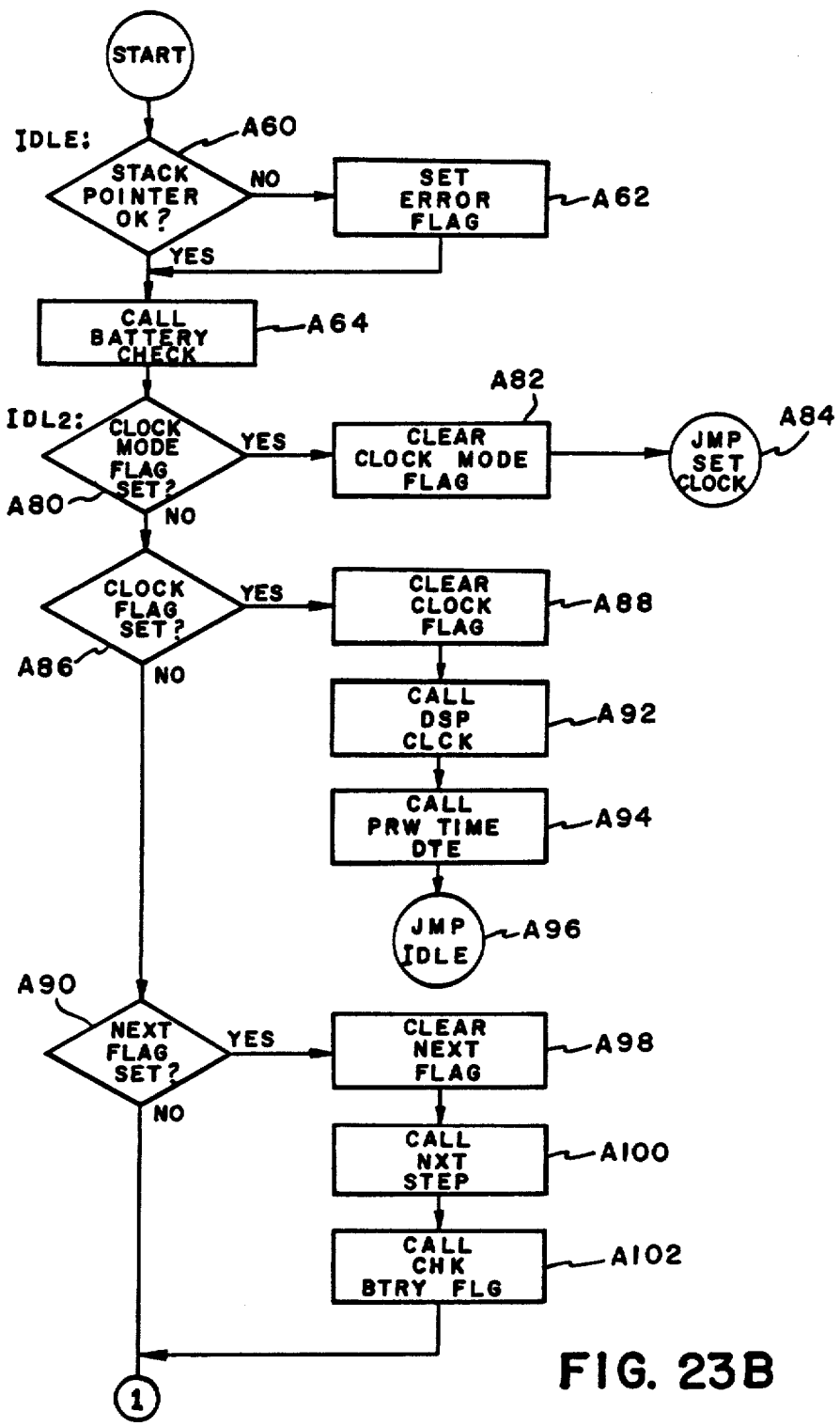
Figure 23C:
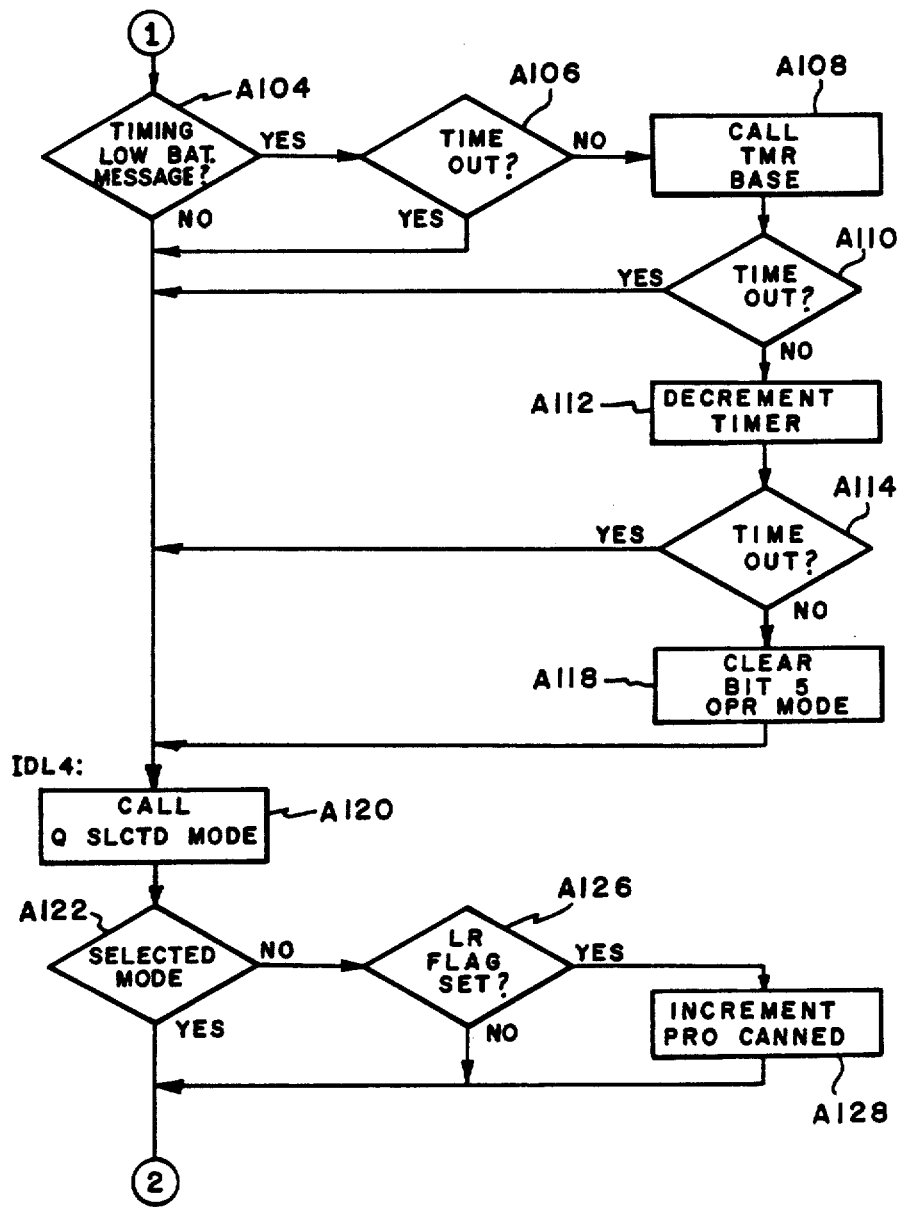
Figure 23D:
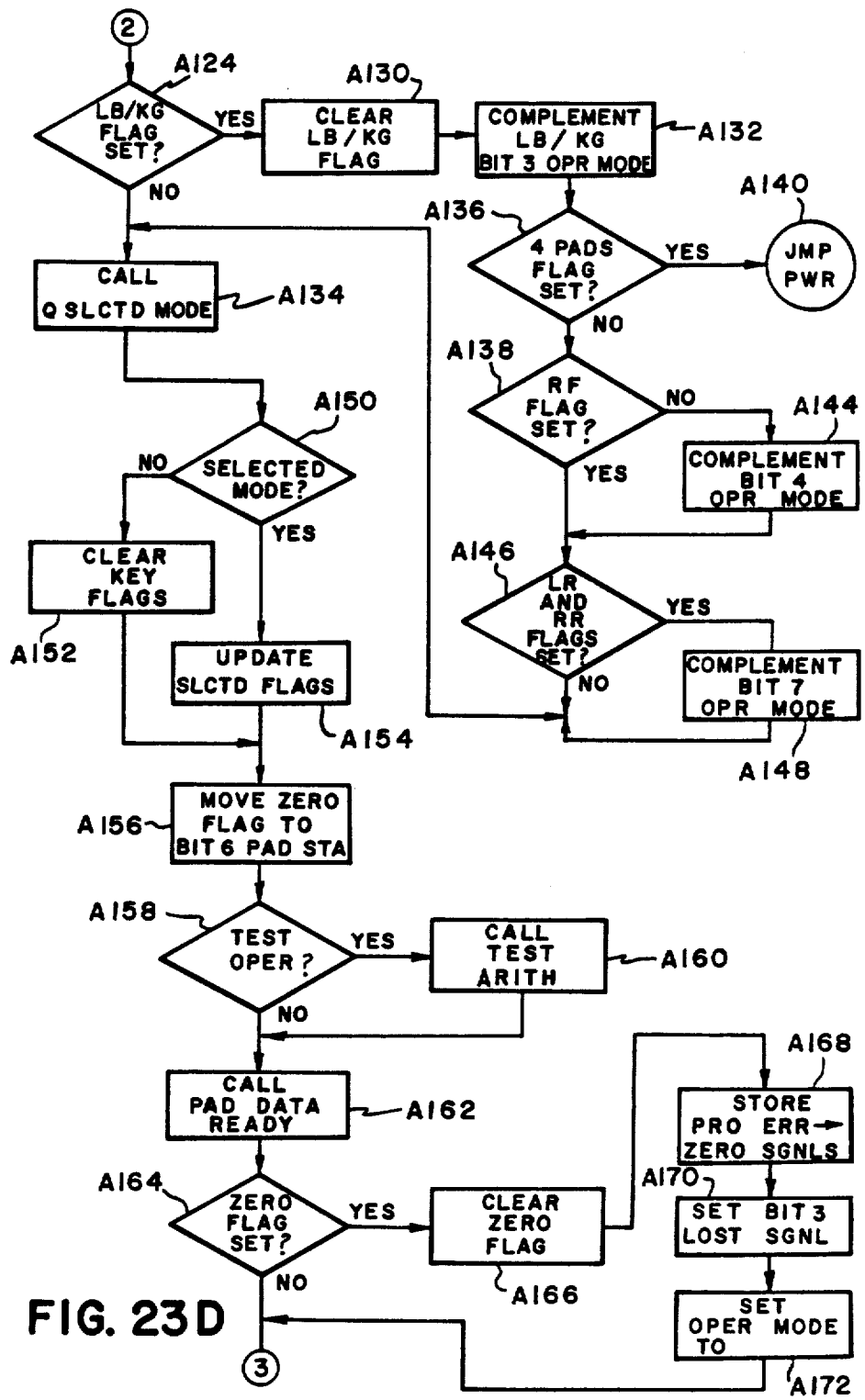
Figure 23E:
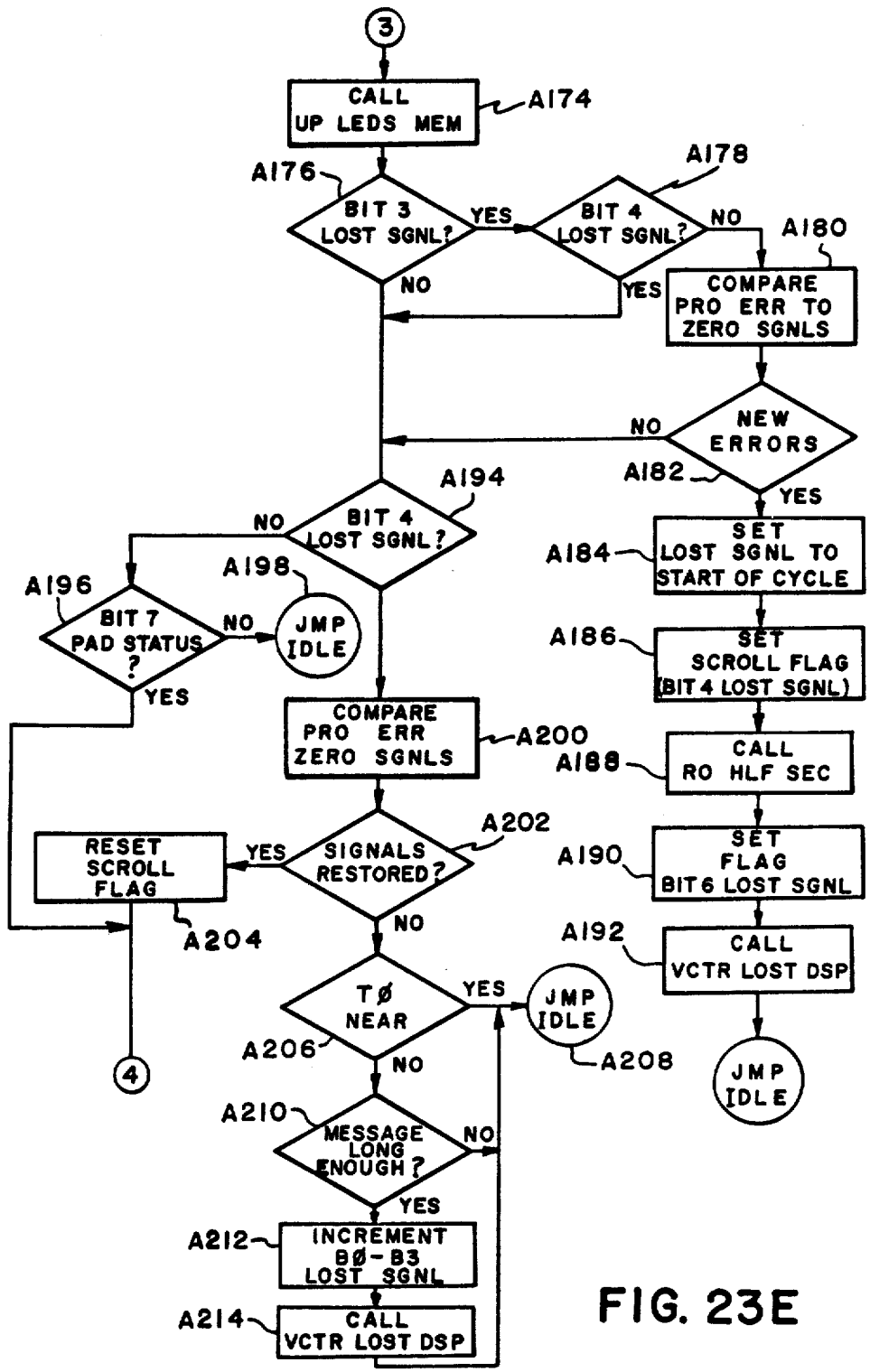
Figure 23F:
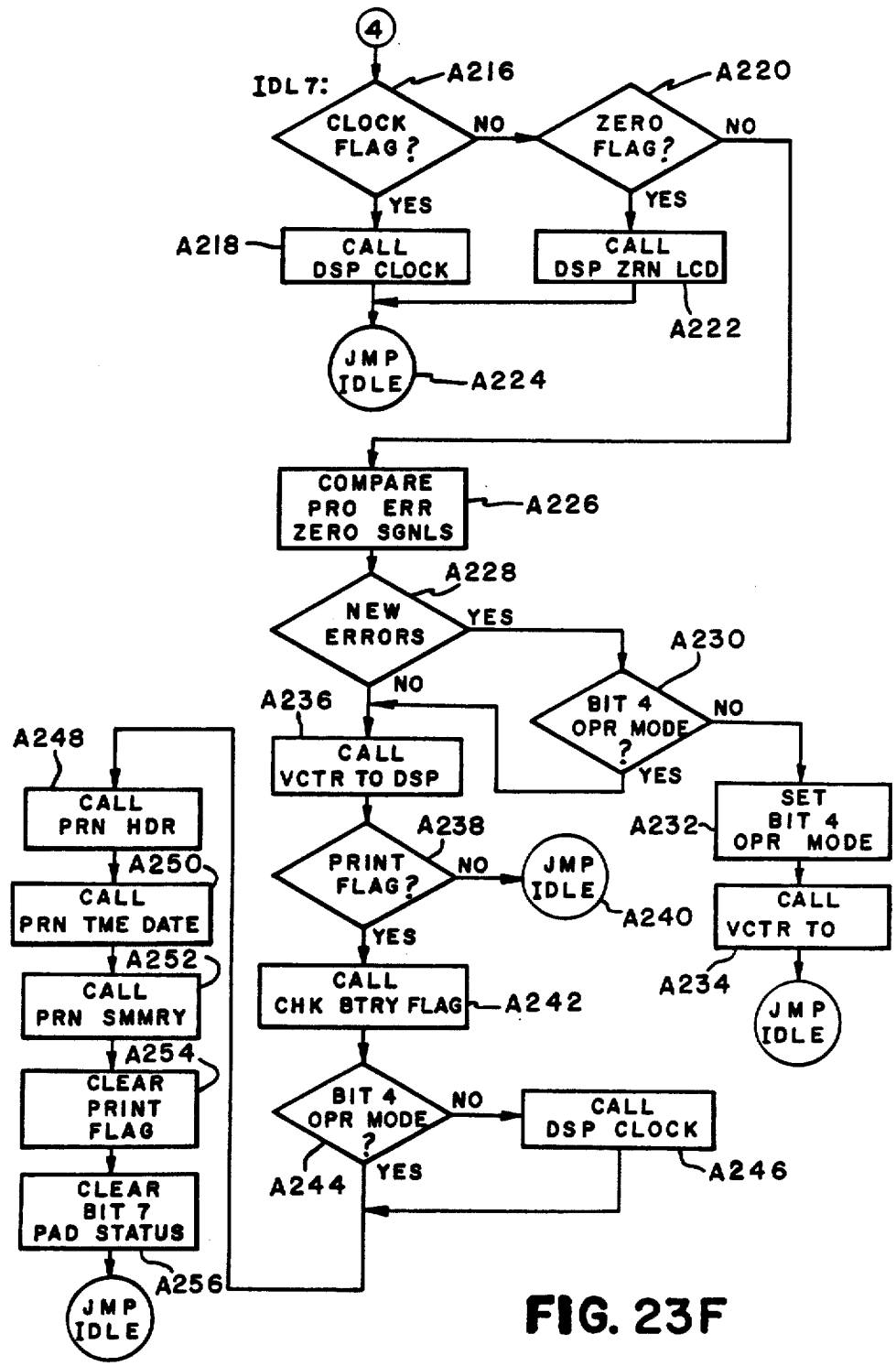
Figure 24A:
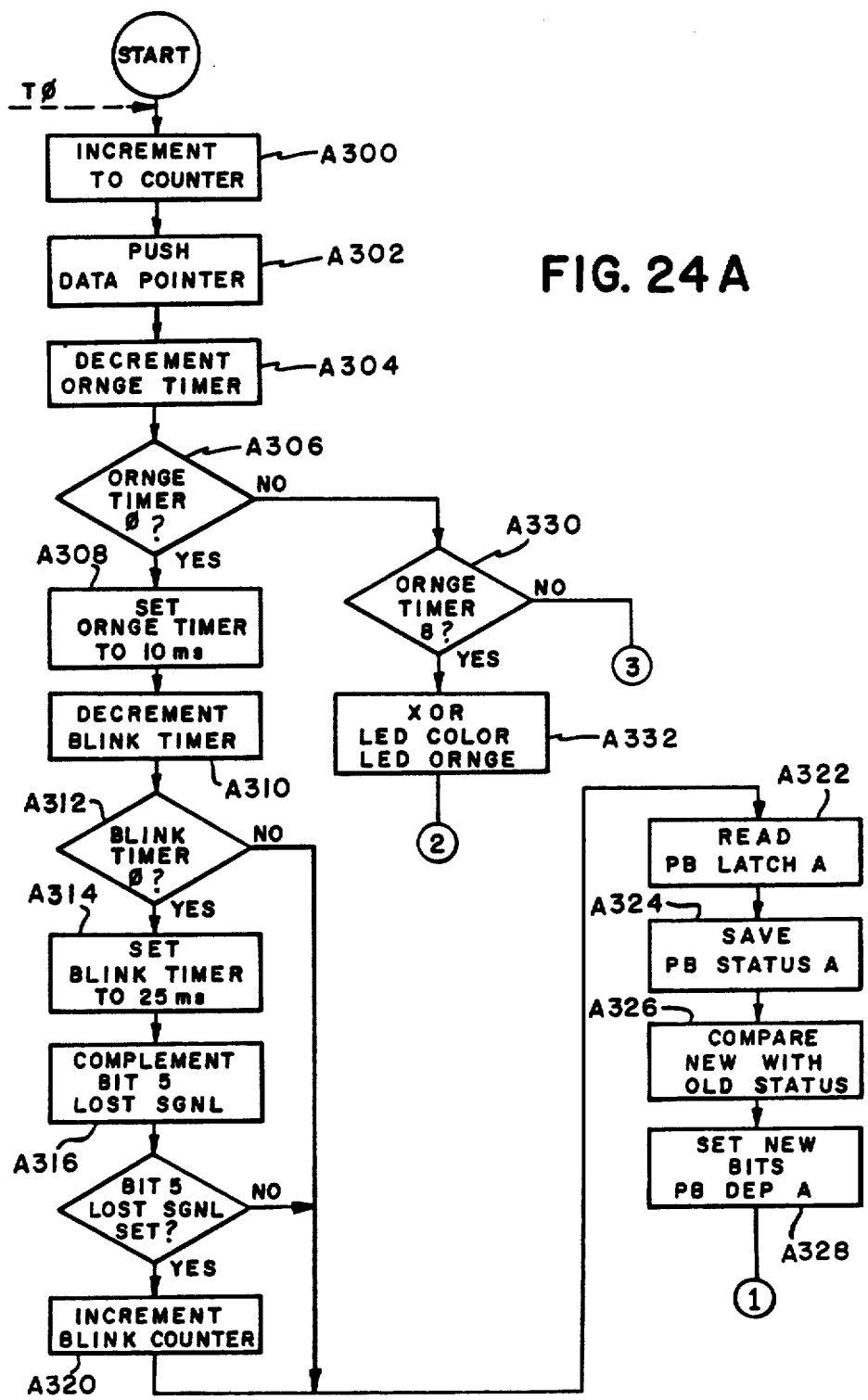
FIGS. 24A-24D are a detailed flow chart of the T0 interrupt routine illustrated in FIG. 21.
Figure 24B:
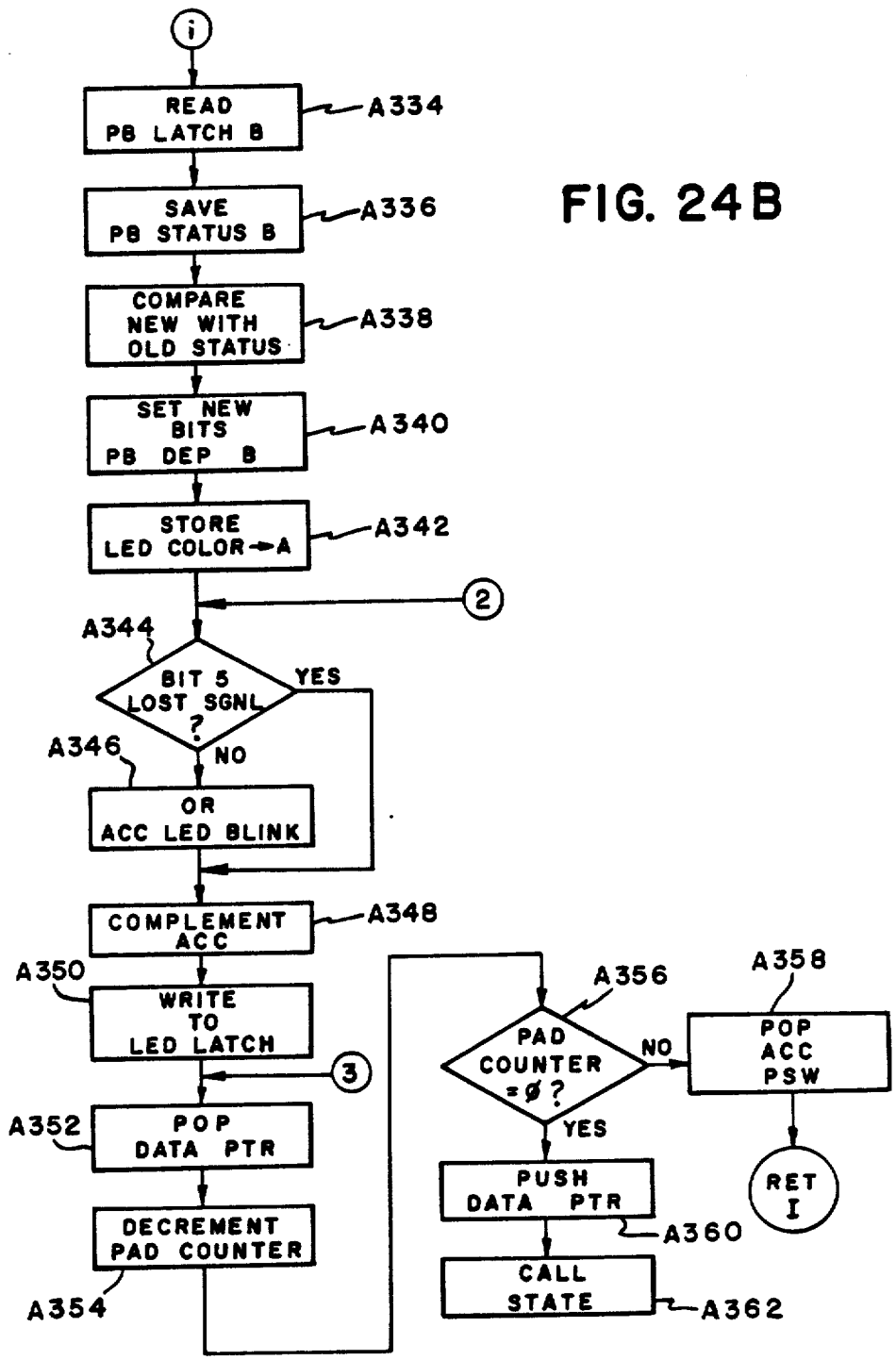
Figure 24C:
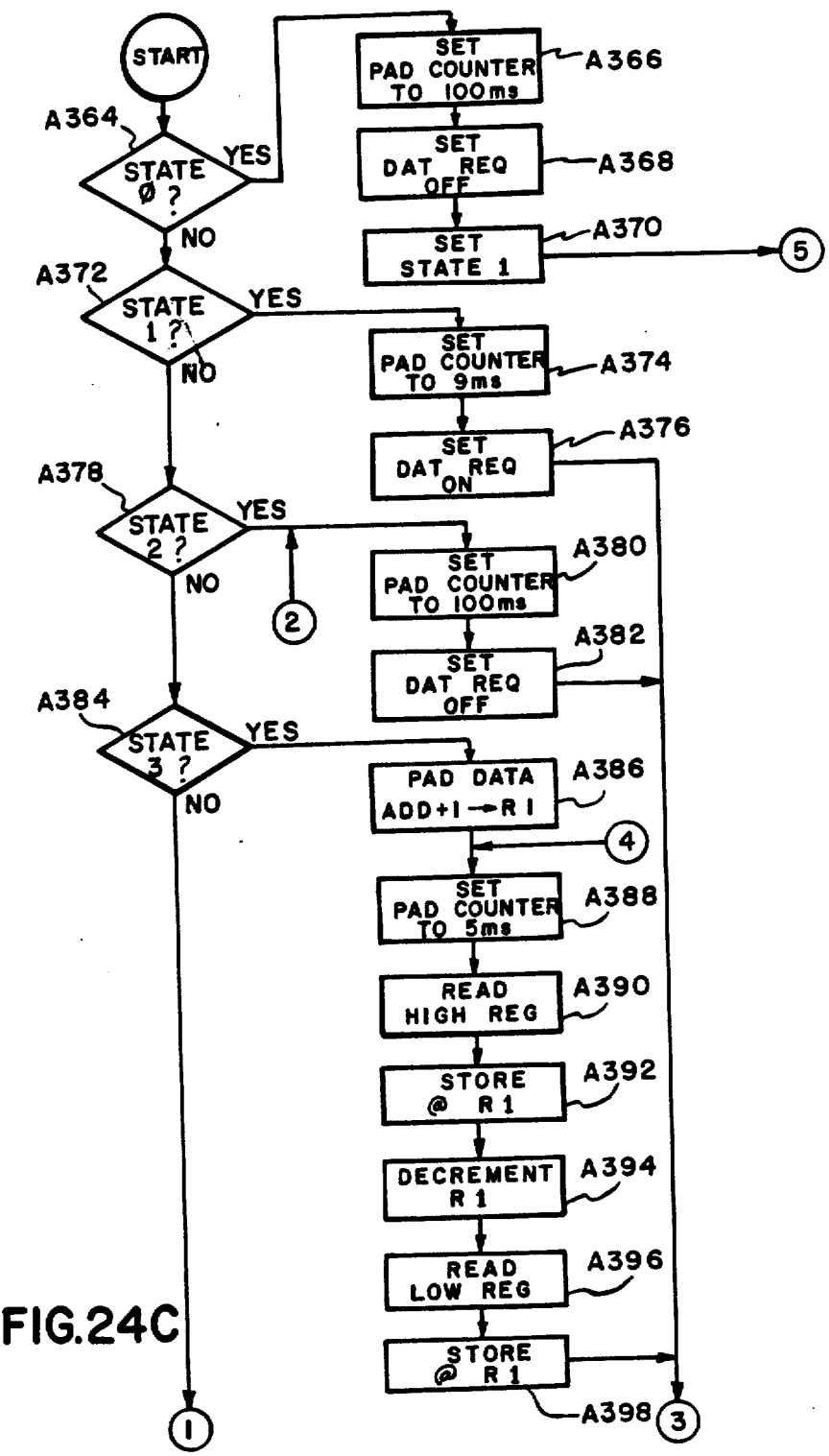
Figure 24D:
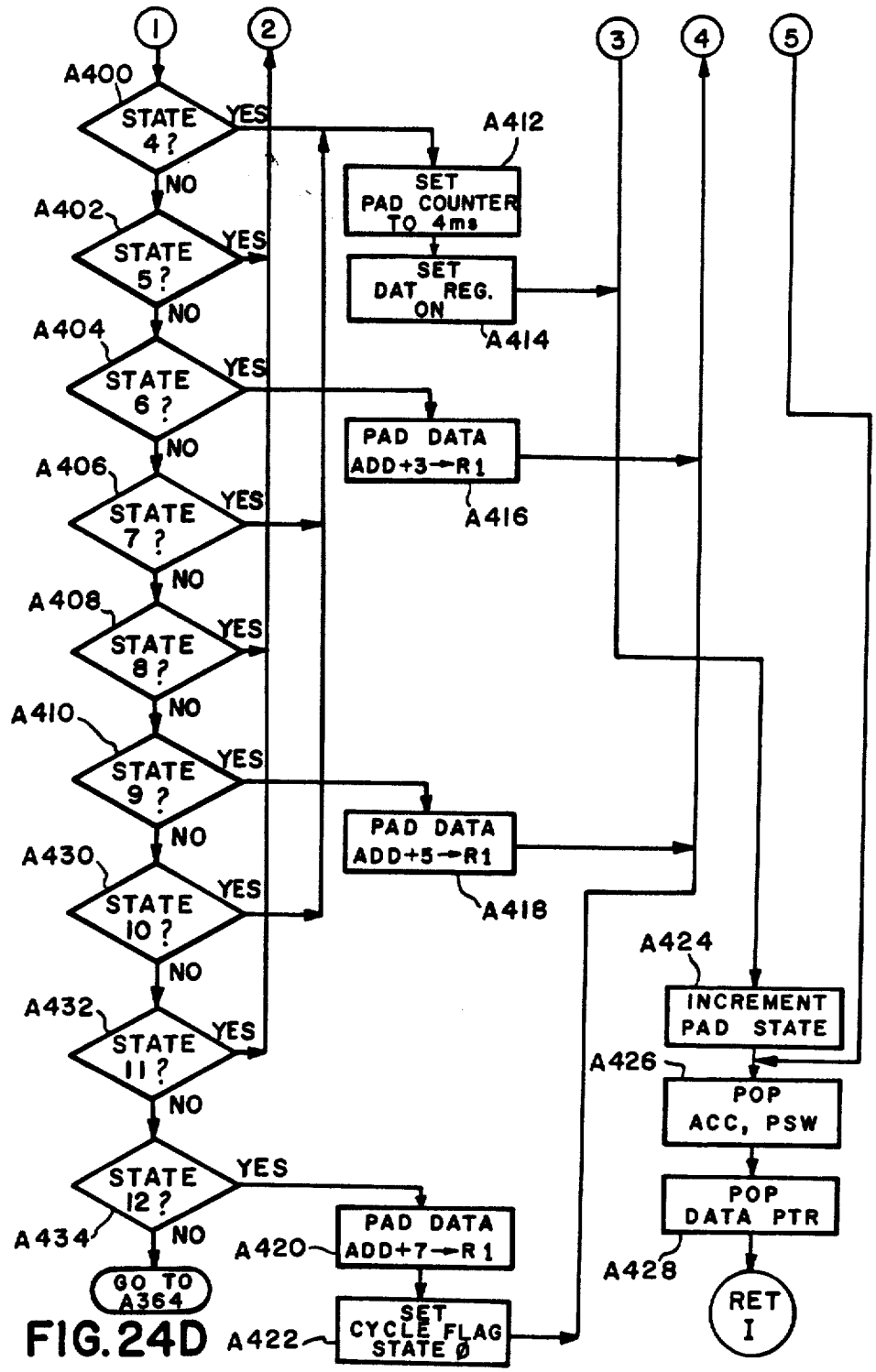

FIG. 23A is a detailed flow chart of the set up routines A31 for the foreground processing loop. The program begins with these routines every power up cycle. In block A10 the program loads the stack pointer address thereby associating a certain location in memory with the stack. Next, in block A12, a routine is called to set up the system function registers. A software watch dog timer is set up in block A14 before the random access memory is cleared in block A16. The next ST4:, allows a warm restart by again loading the stack pointer address in block A18 and setting up the system function registers in block A20. Set up routines for the liquid crystal display (LCD), the input pads, and the arithmetic processor program are called in blocks A22, A24 and A26, respectively. In addition, in block A22, a sign on message for the LCD display is output to alert the operator that the display is operational.

The operating mode of the system is then set to zero in block A28 by clearing the location OPR MODE and all LEDs are turned off in block A30. The system then goes through a power check to be certain that the power supply has had time to settle since the power up command. Basically, the power check loop starts at block A32 and progresses to block A46. A power counter is set to 40 in block A32 and the low power indicator checked in block A34. If the power is low, then in block A36 a delay of 50 ms. is provided to allow the power supply to settle. If the power supply is reading sufficient voltage, a direct path to block A38 calls the subroutine ALIVE which provides a status indicator to other routines. The power counter is then decremented in block A40 and tested in block A42 to determine whether it is zero. Thus, the power loop provides 40 delays before it finally tests the power in block A44. If the power is not fully on and functioning by that time, the program sets an error flag in block A46. Otherwise, it continues to the subsequent set up routines in block A48.

The final set up routines are the battery low warning set up in block A48 and the power down warning set up in block A50. Following these two routines, is a test to determine whether the printer is on in block A52. The printer should be on by this time and an error flag is set if it does not respond to the test in block A54. Otherwise, the printer is operational and a printer sign on message will be printed out in block A56 to insure the operator that it is operational. The system then jumps to the address labeled Idle: to begin the idle loop.

The idle loop (FIGS. 23B-F) starts in block A60 by checking to determine whether the stack pointer is OK. If the stack pointer does not contain the address selected for the stack, then an error flag is set in block A62 before continuing. Next, the battery is checked by calling a routine BATTERY CHECK in block A64.

Following block A80, address IDL2:, the program will test to determine whether certain keys or certain operating modes of the system are requested so that the operations associated with those keys and modes can be provided. The operation of the control keys are kept as flags in a "just depressed" location and the operating mode is stored in location OPR MODE (FIG. 19) to determine the overall status.

In the first block, the program tests to determine whether the CLOCK MODE flag is set. If the flag is set, then the control of the program is transferred to block A82 where the flag is cleared before jumping to the subroutine SET CLOCK in block A84. The routine permits the operator to set the time and data into the real time clock as previously described. The CLOCK flag is next tested in block A86 to determine whether it is set. If the CLOCK flag is set, then in A88 the program clears the flag before continuing. Next, the program calls the routine DSP CLOCK in block A92 to display the present time and date from the real time clock on the LCD display. Further, the time and date are printed on the printer 22 by calling the routine PRN TME DTE in block A94. After the time is displayed on the LCD display 23 and the time and date are printed, the program jumps back to the start of the idle processing loop at block A60.

If none of the flags tested for has been set, the program will then test to determine if the next flag is set in block A90. If the next flag is set, it is cleared in block A98 before continuing by calling the subroutine NXT STEP in block A100. The subroutine NXTSTEP increments the operating mode BIT 0-2 of the display such that more than one format of the weight information can be sequentially displayed on the LCD display. By sequencing the next key, the operator changes the bits stored in OPR MODE (FIG. 19) and causes the display format as shown in FIG. 3A. After the return from the subroutine NXT STEP the subroutine CHK BTRY FLG is called in block A102. This routine checks the battery flag to determine if the low battery warning should be issued.

In block A104, the system determines whether the low battery warning is being displayed at this particular time. If it is, then the system stores the present display and checks for a time out of the display counter in block A106. If the timeout has occurred, the message which was stored in RAM replaces the low battery message and the program continues. Otherwise, the subroutine TMR BASE is called in block A108. The subroutine TMR BASE is a time base routine which updates the timers including the display timer. Again a time out is checked for in block A110 before decrementing the timer in block A112. The lack of the time out in block A110 and A114 causes the system to update the display in block A116 and to clear a bit 5 of the location OPR MODE in block A118 before continuing. Conversely, a timeout in either A110 or block A114 causes an immediate continuation of the program at block A120.

Block A120, labeled IDL4, calls the subroutine Q SLCTD MODE. This subroutine is several instructions in length and determines whether or not the system is in the selected mode. A variable is returned from the routine in the accumulator which is tested in block A122 to determine whether the test is passed. If the system is not in the selected mode, then the left rear (LR) flag is tested to determine whether it is set in block A126. If the test is passed, then the address labeled PRO CANNED in block A128 is incremented. Otherwise, the program continues at block A124.

The LB/KG flag is then tested in block A124. If this flag is set, the program clears the flag in block A130 before continuing. This is a toggle for the system to indicate whether the display is to be in pounds or kilograms. Next, Bit 3 of the location OPR MODE is complemented in block A132 to produce the toggle. A logical "0" for BIT 3 indicates pounds while a logical "1" indicates kilograms.

In the next test, the program determines whether the flag indicating all four pads are to be displayed is set in block A136. If the flag is set, the program jumps to the starting address PWRUP: via block A140. If the flag is cleared, two tests are undertaken in blocks A142 and A146 to determine if the right front (RF) flag and the left rear (LR) and right rear (RR) flags are set, respectively. If the right front flag is set, then Bit 4 of OPR MODE is complimented in block A144 and, if the left and right flags are both set, then bit 7 of the operating mode is complemented in block A148. The program then returns to the start of the main idle path beginning at block A134.

In block A134 and A150 the presence of the selected mode is again tested for. If the system is in the selected mode, then the select flags are updated in block A154. Otherwise, the key flags are all cleared in block A152. Next the zero command flag is moved to bit 6 of the pad status location in block A156 to allow easier testing of this condition. If a test operation flag is found in block A158 then a subroutine TEST ARITH is called in block A160. This subroutine operates on predetermined data rather than the actual data read in from the weighing pads. If the system is not undergoing a test operation, then the subroutine PAD DATA READY is called in block 162. This subroutine processes the pad data until it is ready for display in what ever format the operator has chosen from the control keys. The raw pad data is prepared by a processing routine which converts it into a readily displayable format.

In general, the readings from the four weighing pads are copied to external memory where positive and negative values are converted from sign and 12 bit magnitude format to two byte hexadecimal twos complement format. Each digital increment represents 0.341 pounds (avoirdupois). The last eight measurements are retained and averaged. This average, less the pad zero value, becomes the "pad value". All combinations of pads are then calculated, that is, front pair (LF and RF), rear pair (LR and RR), left pair (LF and LR), right pair (RF and RR), both diagonal pairs (LF and RR, RF and LR), an operator selectable combination, and the total. The weights of the combinations in both pounds and kilograms are then calculated by multiplying each combination by 574.BH and 279.AH, respectively. 341 parts in 1000 equals 574.BH parts in 1000H 100 pounds equals 45.36, hence each increment represents 0.1547 kilograms, 154.7 parts in 1000 equals 279.AH parts in 1000H. Memory for each combination is two bytes, plus or minus 32,767, but each pad is limited to 4095 increments (about 1396.3 pounds), so each combination will be less than 16,380 increments (about 5585.6 pounds). The percentage of each combination is then calculated by dividing each combination by the total of all four. These combinations and their respective percentages are then converted to decimal notation for display and/or printing. Since all arithmetic is in pad value increments each combination is accurate to 0.341 pounds. In addition, when the calculation for each pad occur, the valid data bit for each pad value is tested. A missing data valid bit causes a counter to be incremented and tested against a predetermined number. If the data valid bit is missing from the pad value for a set number of times, for example 3, then the channel is marked as nonoperational by setting a bit corresponding to that channel in PRO ERROR.

Thereafter, in block A164 it is determined whether the zero command flag has been set. If this is the first time through this path of the routine and the zero command flag has just been depressed, the zero flag is cleared in block A166 before determining if there are any communications channels which are not responding. The channels which are selected but not responding are stored as flag bits in a location labeled PRO ERR by the T0 interrupt routine. These channel indications are loaded into another location labeled ZERO SGNLS in block 168 to provide an indication of which channels have been selected and which have not been turned on. Thereafter, in block A170 Bit 3 is set in the location LOST SGNL. This provides an indication of whether the system has been zeroed. The operating mode is then set to the four pad readout mode by block A172.

In block A174 the LEDs are updated by calling the subroutine UP LEDS MEM. This subroutine updates the status of all four LEDs based upon whether there are missing signals, whether the channels have been selected and the time that the missing signals occurred, i.e., before or after zeroing. Next, in block A176 Bit 3 of the location LOST SGNL is tested. If the system has previously been zeroed, then this path through the software will determine whether there are communication channels which have been selected and are now lost. Initially a test is established in block A178 to determine if a Bit 4 of the location LOST SGNL is set. If this bit is set, then a previous pass through these blocks indicated that several channels which were formerly communicating are now inoperative. Therefore, the system will be displaying error messages for the lost signals and the system immediately returns.

Conversely, in block A180, the presently communicating channels are compared with the previously selected channels to determine if there are any new errors. If there are no errors, then in block A182 the system continues at block A194. If there are new errors then a lost channel signal cycle is started by a path through blocks A184–A192. In block A184, the lost signal location is set to the start of the lost signal cycle, so that an entire display sequence can be produced. The scroll flag, Bit 4 of the lost signal location, is then set in block A186 and the one-half second timer for the red LED in each combination is reset in block A188. Bit 6 in the lost signal location is then set in block A190 and the subroutine which displays the lost signal messages is vectored to by calling the subroutine VCTR LOST DSP. After the scrolling of the lost signal messages, the system returns to the idle loop via block A208.

The next sequence of operations, in a path beginning at block A194, is to handle the scrolling of the lost signal messages on the LCD display. In block A194, when the Bit 4 of the LOST SGNL is set, a comparison between the present status of the channels and the ZERO SGNLS location is accomplished in block A200. If the channels which were dead are now communicating, then in block A202 the "signals restored" test is passed and the scroll flag is reset in block A204 before continuing. Otherwise, if the lost signal scroll flag is not set, the system tests to determine if Bit 7 of the PAD STATUS location is set in block A196. If not, the system immediately jumps back to the idle location via block A198.

If Bit 7 of the PAD STATUS location is set then the program is continued at block A216. This operation is a further test of the key flags, particularly the CLOCK flag. If the CLOCK flag is set then the subroutine that displays the present reading of the real time clock, DSP CLOK, is called in block A218. After the display of the time the system jumps back to the start of the idle loop via block A224 to restart the cycle. If the CLOCK flag is not set in block A216, then a test of the zero flag is made in block A220. If the zero flag is set, then the LCD display 23 will display a message which indicates that the system is being zeroed by calling a subroutine DSP ZRN LCD in block A222 before returning to IDLE: via block A224.

If neither of these flags is set then the present status of the channels, PRO ERR, is again compared with those channels which are zeroed ZERO SGNLS, in block A226. If there are no new errors, then the system calls the main display subroutine VCTR TO DSP in block A236. This is the vector to display routine which calls a particular format of display based upon the address contained in a vector. The vector for the subroutine is previously generated by setting the bits of the OPR MODE location. However, if there are new errors in block A228, then in block A230 the OPR MODE location is tested to determine if Bit 4 is set. If Bit 4 is set, then the system calls the display routine in block A236 immediately and, otherwise, sets Bit 4 of the location OPR MODE in block A232. If the program sets Bit 4 in the location OPR MODE in block A232, then it will jump directly to the location VCTR TO FOUR in block A234 which is a direct vector to the display of all four outputs. This prevents combination displays which are in error because of lost signals. The program then jumps to the beginning of the main loop at the location IDLE:

After the display of the particular combination of selected weighing pads or the display of only the total of the four weighing pads, the program will test the print flag in block A238. If the print flag is not set, then the program will immediately jump to the location IDLE: via block A240 to begin the main loop once again. Conversely, if the operator has pressed the print key then the print flag will be set and a number of operations are taken to print the tape in the format seen in FIG. 1A. Initially, the battery flag is checked in block A242 before printing a tape because the printer consumes a relatively large amount of power. Thereafter, the operating mode bit 4 is checked to determine if it set. If not, then the time is displayed by calling the subroutine DSP CLOK in block A246 before continuing. If Bit 4 is set, the program continues immediately to block A248. Thereafter, a number of printing routines are called to first print the header of the tape in block A248, to print the time and date on the tape in block A250, and to print the summary of the weighing data in block A252 subsequently, the print flag is cleared in block A254 and Bit 7 of the PAD STATUS location is cleared in block A256 before exiting to the start of the idle loop.

FIGS. 2A-D are a detailed flow chart of the T0 interrupt subroutine called inblock A29 of FIG. 21. Upon entry into the T0 interrupt routine the T0 counter is incremented in block A300. This causes a reset of the counter such that a time out for a T0 interrupt will occur in a set number of time periods. The T0 counter interrupts to this routine 2,400 times a second. This type of interrupt routine permits the program to read and write those peripheral devices which must be handled quickly in real time. After resetting the counter, the data pointer is pushed on the stack in block A302.

Thereafter, the orange timer is decremented in block A304 and then tested to determine if there has been a time out in block A306. If the orange timer has timed out, then it is reset to 10 ms. in block A208 before continuing. On the other hand, a separate branch causes a control to be transferred to block A330 where the orange timer is tested to determine whether it is equal to 8. If not, then the program jumps to block A352 which path will be more fully explained hereinafter. If the jump is taken to block A352 then the color of the LEDs is correct and there is no need to change the color. If however the orange timer is to 8 which is approximately a third of the original time then the color is changed to the next color by exclusive ORing the bit combination in the memory location labeled LEDCLR and the memory location labeled LEDORNGE in block A332. This procedure sets approximately a ⅓, ⅔ time for the red and the green colors respectively on the LEDs is such that they will appear amber when switched between the two at a frequency of approximately 50 times a second.

Returning now to block A306, if the orange timer has timed out, then in block A308 it is reset to 10 ms. Thereafter, the blink timer is decremented in block A310 before it is tested to determine whether it is zero. If the blink timer is not zero, then the program continues at block A322. Conversely, the blink timer is reset at block A314 to 250 ms. and bit 5 of the memory location labeled LOST SGNL is complemented in block A316. Bit 5 of the LOST SGNL location is then tested in block A318 and the blink counter is incremented in block A320 if the signal is set. Thus, every time that the blink timer times out a switch is set which increments the blink counter to cause another blink cycle for the LEDs to complete.

Both paths are joined at block 322 where the push button latch A is read into memory. The status of the latch is saved in a memory location, PB A STATUS in block A324 and is compared with its old status in block A326. From this comparison the new bits that have been set in the key latch are then recorded as places of the just depressed push button word PB DEP A in block A328. Blocks A334-A340 accomplish he same task for the push button latch B and store the status of the latch and the new bits which have just been pushed in locations PB B STATUS, PB DEP B, respectively. Thereafter, in block A342 the bits which are set in the location LED COLOR are stored in the accumulator. Next, Bit 5 of the LOST SGNL location is tested to determine if it is set. If not, then the accumulator containing the color bits for particular LEDs is logically ORed with the location labeled LED BLINK in block A346. This produces the blinking operation for the LEDs, if such is activated. Otherwise, if the bit 5 of the LOST SGNL location is set, the accumulator is merely complemented to provide the right logic levels for the LED and is written to the LED latch in block A350. As a final portion of this part of the subroutine, the data pointer is popped off the stack and restored in block A352.

The program then enters a state machine for reading in the pad data registers of the interface circuit so that all the data from the weighing pads may be accumulated. The state machine is a timing program which uses the T0 counter as a time base. A pad counter, which can be decremented each time through the T0 loop, provides a variable time with duration depending upon a state variable. When the state machine loop is entered, the pad counter is decremented in block A354 before testing its status in block A356. If the pad counter is not zero, the program will exit from the interrupt routine through block A358. Block A358 restores the accumulator and program status word from the stack. If, however, the pad counter is zero, then the state machine will test the state of operation and perform a corresponding function. The path begins at block A360 by first pushing the data pointer onto the stack and entering the state machine at block A364.

The state machine calculates an address for a particular state and the transfers control to that address. The state machine has 12 states corresponding to the DATA REQ signal (FIG. 9A). Depending upon the state, a different path will be taken to perform a specific function before exiting the routine after block A428.

State 0 causes a transfer of control to blocks A330, A366 where the pad counter is set to 100 ms. The data request bit is then set to off at block A368 and the state variable set to 1 in block A370 before exiting through blocks A426, A428 and the interrupt return. Blocks A426 and A428 restore the accumulator, program status word, and data pointer from the stack respectively. This operation allows a 100 ms. clear delay before generating the master reset pulse of the interrogate signal.

When the pad counter again becomes zero, 100 ms. after the path through blocks A336 through A370 taken, the state variable will equal 1 and the test in block A372 will be affirmative. The pad counter is then set to 9 ms. in block A374 and the data request bit is set to on in block A376 before exiting through blocks A424, A426 and A428. Block A424 increments the pad state before continuing which means it will now be incremented to state 2. This path generates the 9 ms. master reset signal to all of the weighing pads such that they can begin the interrogate response cycle.

Again, after 9 ms., the pad counter will time out and the path will continue at address ST02: for state 2. The pad counter is reset to 100 ms. in block A380 and then the data request bit turned off in block A382. The pad state is incremented to state 3 and then the program exists through the interrupt return. This path provides another 100 ms. waiting period while the weighing pads reset and pad 1 accomplishes an analog to digital conversion of its weight signal in response to the master reset signal. Further, this time is necessary to allow the address decoder of the weighing pad to recognize its address, transmit the data to the interface circuit and have the interface circuit store the data in the pad data registers.

Thereafter the pad counter will be zero after 100 ms., and the program will continue at address ST03: The program then continues in block A386 by loading register R1 with the address of the pad data table plus 1. The pad counter is set to 5 ms. in block A388 before reading the high data register in block A390 from the interface circuit 102. This data is then stored to the location pointed to by the value in R1 in block A392. Register R1 is then decremented to point to the previous memory location in block A394. Subsequently, the low data register of the interface circuit 102 is read in block A396 and it is stored to the location pointed to by the contents of register R1. The program then exits by incrementing the state to 4 and flowing through the interrupt return. This allows both data bytes of the pad data for the weighing pad 1 to be read into the pad data table in the correct order and further permits a 5 ms. delay before beginning another transmission to allow clearing of the communication channels.

After the 5 ms. delay the pad counter will again time out and transfer control to address ST04: This will cause the pad counter to be set to 4 ms. in block A412 and to set the data request bit on in block A414. As was the previous case, the exit to the interrupt return is proceeded by incrementing the pad state to state 5 in block A424 and restoring the accumulator, program status word, and data pointer in block A426 and block A428, respectively. The 4 ms. data request signal is the address bit for weighing pad 2 and causes the weighing pad to respond with its information signal. This information signal is received by the interface during state 5. State 5 causes the program to transfer control to address ST02: which performs another 100 ms. delay with the data request a bit off. This delay is used to receive and upload the pad data registers with the weight information from weighing pad 2.

Next in sequence is state 6 which causes a transfer to address ST06: where the address of the pad data table plus 3 is loaded into register R1 before transferring to control block A388. These steps transfer the pad 2 weight data from the interface registers to the pad data table memory. Again a 5 ms. delay is provided between the read operation and the next state which is 7. The program, when it finds state 7 transfers control to the address ST04: at block A412 providing another 4 ms. data request. This is the address bit for weighing pad 3 of the data request signal and will cause weighing pad 3 to respond. Therefore, state 8 causes a 100 ms. delay to allow the third channel to respond before it is read in by placing the pad data table address, ADD+5, into the register R1 in block A418. State 9 continues by reading the data contained in the registers of the interface 102 into the memory by going the path beginning at block A388.

The state machine thereafter is incremented to state 10 where it generates the final address bit for the fourth pad by providing a data request bit on signal for 4 ms. The operational path is through blocks A412, A414, A424, A426 and A428. The next state 11 is another 100 ms. delay to allow the data from the fourth channel to be read into the registers of the interface. State 12 which follows, allows the data to be read in by loading register R1 with the pad data table pointer ADD+7 in block A420. In block A422, this being the final input of pad data, the pad data cycle complete flag will be reset and the state variable reset to zero before reading the registers to memory by the path through blocks A388–A398. The routine exits from state 12 through the normal path of block A424, A426 and A428.

While a preferred embodiment has been shown and described in detail, it will be obvious to those skilled in the art that various modifications and changes may be made thereto without departing from the spirit and scope of the invention as defined in the appended claims.

What is claimed is:

1. A weighing system for weighing a load at a plurality of locations, said apparatus comprising:
   a plurality of weighing pads, each of said weighing pads supporting said load at one of the locations to be weighed and each of said weighing pads including a load cell for producing an analog weight signal representative of the weight of the load at the location of said weighing pad, means for converting said weight signal into a digital infra-red information signal and for transmitting said information signal in a wireless manner, means for receiving a digital infra-red interrogation signal which is transmitted in a wireless manner, and means for enabling said converting and transmitting means in response to the receipt of said interrogation signal; and
   central control means, located remotely from said plurality of weighing pads and including means for generating said interrogation signal as a digital infra-red signal in a wireless manner, means for receiving said respective infra-red information signals from each of said weighing pads, and means for processing each information signal to determine the weight of the load at each respective pad location.

2. A weighing system as set forth in claim 1 wherein said means for receiving said respective infra-red information signals includes:
means for detecting infra-red radiation;
means for generating a data signal from said detected infra-red radiation as a series of pulses whose widths are a data bit width;
means for generating a clocking signal synchronously with said data signal; and
a serial to parallel converter wherein said data signal is serially input to said converter with said clocking signal and is output in parallel in response to a read data signal.

3. A weighing system as set forth in claim 1 wherein said means for receiving a digital infra-red interrogation signal includes:
means for determining the width of a pulse from said interrogation signal;
counter means which is preset to a predetermined number when said determining means decodes said master reset pulse and clocked when said determining means decodes an address pulse;
said counter means generating a conversion signal when it counts a predetermined number of address pulses; and
wherein said conversion signal is applied to said means for converting and to said parallel to serial converting means thereby enabling said weight signal to information signal conversion.

4. A weighing system as set forth in claim 1 wherein said means for receiving said infra-red information signal includes:
a plurality of photo-diodes which are connected in parallel and which generate source current in response to being impinged upon by radiation in the infra-red spectrum, said plurality of photo-diodes being reversed biased and connected in series to an inductor which presents a relatively high impedance to said information signal and a relatively low impedance to other optical radiation; and
amplifier means having a signal input for amplifying the information signal detected by said plurality of diodes, wherein said plurality of photo-diodes are capacitively coupled to said signal input.

5. A weighing system as set forth in claim 1 wherein said means for receiving said infra-red interrogation signal includes:
a plurality of photo-diodes which are connected in parallel and which generate source current in response to being impinged upon by radiation in the infra-red spectrum, said plurality of photo-diodes being reversed biased and connected in series to an inductor which presents a relatively high impedance to said interrogation signal and a relatively low impedance to other optical radiation; and
amplifier means having a signal input for amplifying the interrogation signal detected by said plurality of diodes, wherein said plurality of photo-diodes are capacitively coupled to said signal input.

6. A weighing system as set forth in claim 1 wherein said means for converting said weight signal into said infra-red information signal includes:
means for generating a periodic series of short pulses;
means for gating said pulses on and off into said information signal forming a series of pulse groups which represent whether a bit is present or absent;
a power amplifier for amplifying said information signal into high power current pulses;
means for emitting infra-red radiation driven by the information signal pulses from said power amplifier;
means for converting said weight signal into a digital value representative thereof;
a parallel to serial converter;
means for loading said digital value in parallel into said parallel to serial converter; and
means for shifting out said digital value in series from said parallel to serial converter, wherein said serial output is applied to said means for gating.

7. A weighing system as set forth in claim 6 wherein:
said means for converting is enabled by said receiving means decoding the presence of said interrogation signal and the address of a respective weighing pad.

8. A weighing system as set forth in claim 1 wherein said means for generating said infra-red interrogation signal includes:
a plurality of light emitting diodes which emit radiation in the infra-red spectrum;
an operational amplifier having an inverting input, a noninverting input, and an output, wherein said plurality of diodes are connected between said output and one of said inputs through an impedance and a logic level interrogation signal is connected to the other input.

9. A weighing system as set forth in claim 8 wherein:
said plurality of diodes are connected in series between said output and said one input.

10. A weighing system as set forth in claim 1 wherein said means for generating said infra-red information signal includes:
a plurality of light emitting diodes which emit radiation in the infra-red spectrum;
an operational amplifier having an inverting input, a noninverting input, and an output, wherein said plurality of diodes are connected between said output and one of said inputs through an impedance and a logic level interrogation signal is connected to the other input.

11. A weighing system as set forth in claim 10 wherein:
said plurality of diodes are connected in series between said output and said one input.

12. A weighing system as set forth in claim 1 wherein said means for generating said interrogation signal includes:
means for generating a periodic series of short pulses;
means for gating said pulses on and off into said interrogation signal to form a series of pulse envelopes of variable duration;
a power amplifier for amplifying said interrogation signal into high power current pulses;
means for emitting infra-red radiation driven by the interrogation signal pulses from said power amplifier.

13. A weighing system as set forth in claim 12 wherein:
said processor means includes means for generating said interrogation signal as a series of digital pulses of variable pulse width, wherein a first pulse is of a width representative of a master reset pulse which initializes all of the said weighing pads to listen for their respective address, and the pulses which follow are of a width representative of an address pulse and comprise an address.

14. A weighing system as set forth in claim 13 wherein:
said processor means includes means for transferring said information signal from said receiving means after the address of the respective weighing pad has been generated.

15. A weighing system as set forth in claim 13 wherein said central control means further includes:
means for enabling said receiving means after said interrogation signal is transmitted and for disabling said receiving means after each respective said information signal is received.

16. A weighing system as set forth in claim 13 wherein each of said plurality of weighing pads includes:
means for detecting said address pulses by determining their duration;
a counter which is clocked by each detected address pulse; and
means for decoding the status of the counter and for generating an enabling signal when a particular address pulse is received.

17. A weighing system as set forth in claim 16 which further includes:
means for detecting the first address pulse of said interrogation signal and for presetting said counter;
wherein said counter is preset to a particular count and is clocked by each detected address pulse, said counter overflowing upon the occurrence of said associated address pulse to generate said enabling signal.

18. A weighing system as set forth in claim 17 which further includes:
a parallel to serial converter which is loaded in parallel with said weight signal subsequent to said conversion and unloaded in series to generate said information signal as a serial digital signal.

19. A weighing system as set forth in claim 18 which further includes:
means for varying the duration of each bit of said serial information signal in accordance with whether the bit is a logical one or a logical zero.

20. A weighing system as set forth in claim 19 wherein said means for receiving said information signals includes:
means for detecting the duration of each bit of said information signal and for converting said bits into a serial digital signal.

21. A weighing system as set forth in claim 20 which further includes:
a serial to parallel shift register; and
means for clocking said serial digital signal into said serial to parallel shift register.

22. A weighing system as set forth in claim 21 wherein said central control includes a microprocessor having a data bus and wherein:
the parallel outputs of said serial to parallel shift register are connected to the data bus of said microprocessor.

23. A weighing system as set forth in claim 22 wherein:
said serial to parallel shift register is in the memory space of said microprocessor whereby its contents can be read into memory by strobing an address select line of said microprocessor.

24. A weighing system as set forth in claim 1 wherein said means for receiving said infra-red information signal includes:
a plurality of photo-diodes which generate source current in response to being impinged upon by radiation in the infra-red spectrum; and
amplifier means for amplifying the information signal detected by said plurality of diodes.

25. A weighing system as set forth in claim 24 wherein:
said plurality of photo-diodes are connected in parallel across the signal inputs of said amplifier means.

26. A weighing system as set forth in claim 25 wherein:
said plurality of photo-diodes are reversed biased.

27. A weighing system as set forth in claim 26 which further includes:
an impedance connected in series with said plurality of diodes which presents a relatively high impedance to said information signal and a relatively low impedance to other optical radiation.

28. A weighing system as set forth in claim 27 wherein:
said impedance is an inductance.

29. A weighing system as set forth in claim 28 wherein:
said plurality of photo-diodes are capacitively coupled to said amplifier means.

30. A weighing system as set forth in claim 1 wherein said means for receiving said infra-red interrogation signal includes:
a plurality of photo-diodes which generate source current in response to being impinged upon by radiation in the infra-red spectrum; and
amplifier means for amplifying the information signal detected by said plurality of diodes.

31. A weighing system as set forth in claim 30 wherein:
said plurality of photo-diodes are connected in parallel across the signal inputs of said amplifier means.

32. A weighing system as set forth in claim 31 wherein:
said plurality of photo-diodes are reversed biased.

33. A weighing system as set forth in claim 32 which further includes:
an impedance connected in series with said plurality of diodes which presents a relatively high impedance to said interrogation signal and a relatively low impedance to other optical radiation.

34. A weighing system as set forth in claim 33 wherein:
said impedance is an inductance.

35. A weighing system as set forth in claim 34 wherein:
said plurality of photo-diodes are capacitively coupled to said amplifier means.

* * * * *

UNITED STATES PATENT AND TRADEMARK OFFICE
CERTIFICATE OF CORRECTION

PATENT NO. : 4,969,112

DATED : November 6, 1990

INVENTOR(S) : J. Castle

It is certified that error appears in the above-identified patent and that said Letters Patent is hereby corrected as shown below:

Column 5, Line 29, "byes" should be --eyes--.

Column 7, Line 66, "78" in the first instance should be --76--.

Column 10, Line 7, after "ground" insert --.-- and delete space before "ground".

Column 17, Line 52, "16-it" should be --16 bit--.

Column 19, Line 5, after "next" insert --address--.

Column 19, Line 64, "data" should be --date--.

Column 21, Line 18, "what ever" should be --whatever--.

Column 21, Line 37, after "1000H" insert --,--.

Column 23, Line 3, after "zeroed" insert --,--.

Column 23, Line 43, after "A252" insert --.--.

Column 23, Line 43, "subsequently" should be "Subsequently--.

Column 23, Line 47, "2A-D" should be --24A-D--.

Column 23, Line 48, "inblock" should be --in block--.

UNITED STATES PATENT AND TRADEMARK OFFICE
CERTIFICATE OF CORRECTION

PATENT NO.   : 4,969,112
DATED        : November 6, 1990
INVENTOR(S)  : J. Castle It is certified that error appears in the above-identified patent and that said Letters Patent is hereby corrected as shown below:

Column 24, Line 32, "he" should be --the--.

Signed and Sealed this

Twenty-ninth Day of September, 1992

Attest:

DOUGLAS B. COMER

Attesting Officer      Acting Commissioner of Patents and Trademarks